US012606440B2

(12) United States Patent
Suda et al.

(10) Patent No.: US 12,606,440 B2
(45) Date of Patent: Apr. 21, 2026

(54) CARBON NANOTUBE DISPERSION COMPOSITION, MIXTURE SLURRY, ELECTRODE FILM, AND SECONDARY BATTERY

(71) Applicants: artience Co., Ltd., Tokyo (JP); TOYOCOLOR CO., LTD., Tokyo (JP)

(72) Inventors: Yasuaki Suda, Tokyo (JP); Daichi Ito, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 19/115,246

(22) PCT Filed: Aug. 28, 2024

(86) PCT No.: PCT/JP2024/030811
§ 371 (c)(1),
(2) Date: Mar. 25, 2025

(87) PCT Pub. No.: WO2025/047828
PCT Pub. Date: Mar. 6, 2025

(65) Prior Publication Data
US 2025/0256969 A1 Aug. 14, 2025

(30) Foreign Application Priority Data
Sep. 1, 2023 (JP) ................................. 2023-142456

(51) Int. Cl.
*C01B 32/174* (2017.01)

(52) U.S. Cl.
CPC ........ *C01B 32/174* (2017.08); *C01B 2202/22* (2013.01); *C01B 2202/32* (2013.01); *C01B 2202/36* (2013.01); *C01P 2006/12* (2013.01); *C01P 2006/22* (2013.01); *C01P 2006/40* (2013.01)

(58) Field of Classification Search
CPC .............. C01B 32/174; C01B 2202/22; C01B 2202/32; C01B 2202/36; C01P 2006/12; C01P 2006/22; C01P 2006/40
See application file for complete search history.

(56) References Cited

U.S. PATENT DOCUMENTS

2006/0052509 A1 3/2006 Saitoh
2016/0340521 A1* 11/2016 Yoshiwara ........... C09D 133/08
2023/0307653 A1 9/2023 Morita et al.
2025/0002351 A1* 1/2025 Kang .................... H01M 4/622

FOREIGN PATENT DOCUMENTS

EP 4458910 11/2024
JP 2004167667 6/2004
JP 2015195143 11/2015
JP 2016028109 2/2016
JP 2020164354 A * 10/2020 ........... C01B 32/174
KR 1020230084248 6/2023
WO 2022075387 4/2022
WO WO-2023068780 A1 * 4/2023 ......... H01M 10/052
WO 2023127931 7/2023

OTHER PUBLICATIONS

Clarivate Analytics machine translation of JP 2020164354 A to Shu et al. (Year: 2020).*
Tuball 01RW03 technical data sheet from OCSiAl. v12 Jul. 2024 (Year: 2024).*
"International Search Report (Form PCT/ISA/210) of PCT/JP2024/030811", mailed on Nov. 26, 2024, with English translation thereof, pp. 1-4.
"Written Opinion of the International Searching Authority (Form PCT/ISA/237) of PCT/ JP2024/030811", mailed on Nov. 26, 2024, with English translation thereof, pp. 1-6.
"Notice of Reason for Rejection of Korea Counterpart Application", issued on Sep. 17, 2025, with English translation thereof, p. 1-p. 8.

* cited by examiner

*Primary Examiner* — Jane L Stanley
(74) *Attorney, Agent, or Firm* — JCIPRNET

(57) ABSTRACT

A carbon nanotube dispersion composition includes carbon nanotubes (A), a dispersant (B), and a solvent (C). A particle diameter $D_{50}$ at a cumulative volume of 50% according to laser diffraction particle size distribution measurement is 0.3 to 7 μm, and (1) and (2) below are satisfied. (1) The dispersant (B) is a polymer that has a weight average molecular weight of 5,000 or more and 360,000 or less and includes a carboxyl group-containing structural unit derived from at least one of (meth)acrylic acid and (meth)acrylate having a carboxyl group. (2) When the particle diameter $D_{50}$ at a cumulative volume of 50% according to laser diffraction particle size distribution measurement of the carbon nanotube dispersion composition is X [μm], and a pH is Y, X and Y satisfy (Formula a) and (Formula b) below:

$$Y \geq -0.149X + 4.545 \qquad \text{(Formula a)}$$

$$Y \leq -0.134X + 5.140. \qquad \text{(Formula b)}$$

11 Claims, No Drawings

CARBON NANOTUBE DISPERSION COMPOSITION, MIXTURE SLURRY, ELECTRODE FILM, AND SECONDARY BATTERY

CROSS-REFERENCE TO RELATED APPLICATION

This application is a 371 application of the International PCT application serial no. PCT/JP2024/030811, filed on Aug. 28, 2024, which claims the priority benefits of Japan Patent Application No. 2023-142456, filed on Sep. 1, 2023. The entirety of each of the above-mentioned patent applications is hereby incorporated by reference herein and made a part of this specification.

TECHNICAL FIELD

The present disclosure relates to a carbon nanotube dispersion composition, more specifically, to a carbon nanotube dispersion composition, a mixture slurry including the carbon nanotube dispersion composition and an active material, an electrode film formed from the mixture slurry, and a secondary battery including the electrode film.

BACKGROUND ART

With the spread of electric vehicles, and miniaturization, weight reduction, and performance enhancement of portable devices, there is a demand for secondary batteries with high energy density and increased capacity. Against this background, secondary batteries using non-aqueous electrolytes, especially lithium ion secondary batteries, are being used in many devices due to characteristics of high energy density and high voltage.

Since the capacity of lithium ion secondary batteries largely depends on the positive electrode active material and the negative electrode active material, which are the main materials, various materials for use as these electrode active materials are being actively researched.

However, the charging capacity obtained in the case of using electrode active materials that are being practically used has all reached a level close to the theoretical value, and improvement of electrode active materials is approaching its limit. Under such circumstances, for negative electrode active materials, silicon-based active materials, which are capable of reversibly doping more lithium ions compared to the current graphite powder, are promising. However, in the case of using silicon-based active materials, there is a problem that due to volume changes upon absorption and release of lithium ions during charging and discharging, cracking or particle isolation tend to occur, and capacity decreases with repeated charging and discharging.

In addition, techniques using carbon nanotubes as a conductive material are being considered to improve conductivity of electrodes. By using carbon nanotubes, an action of reducing electrode resistance can be expected. Particularly, in the case of using carbon nanotubes in the negative electrode, the following action can be expected: electrical isolation of silicon-based active materials with low conductivity due to volume changes upon absorption and release of lithium ions during charging and discharging is prevented, and the battery life is improved.

In recent years, the use of carbon nanotube dispersion liquids has become mainstream as a method for adding carbon nanotubes to mixture slurries for secondary batteries. By configuring the dispersion particle diameter of such carbon nanotube dispersion liquids within an appropriate range, conductive paths can be established between active materials that store lithium ions.

Thus, for example, Patent Document 1 discloses a method for stabilizing dispersion of a carbon nanotube dispersion liquid by specific particle size distribution properties to improve conductivity, and improving cycle characteristics when used in a secondary battery, the carbon nanotube dispersion liquid being an aqueous dispersion liquid of sodium carboxymethyl cellulose of multi-walled carbon nanotubes with an average fiber outer diameter in the range of 50 to 110 nm.

Patent Document 2 discloses a method for providing a carbon nanotube dispersion liquid, which is a dispersion liquid containing 2 to 15 weight % of a carbon nanotube powder with a BET specific surface area value of 70 to 250 $m^2/g$, and having a viscosity value of 2 to 110 mPa·s at a temperature of 25° C. and a shear rate of 383 $s^{-1}$, and by further adjusting the dispersion particle diameter d50 to 100 to 600 nm, the carbon nanotube dispersion liquid is excellent in cycle characteristics.

RELATED ART DOCUMENTS

Patent Documents

Patent Document 1: Japanese Patent Application Laid-Open No. 2016-028109

Patent Document 2: Japanese Patent Application Laid-Open No. 2015-195143

SUMMARY OF INVENTION

Problem to be Solved by Invention

According to these methods, it is possible to suppress localization of conductive materials in the electrode due to entanglement of carbon nanotubes, and maintain conductive paths to improve cycle characteristics.

However, carbon nanotubes generally form aggregates due to entanglement of carbon fibers with nano-sized outer diameters. Since it is extremely difficult to defibrate and disperse these aggregates, it is difficult to obtain a carbon nanotube dispersion composition with high initial fluidity and excellent dispersion stability. In addition, in the case of using a carbon nanotube dispersion composition with poor fluidity, diffusion of conductive materials becomes insufficient in the mixture slurry obtained by further adding active materials. When forming a coating film, internal resistance at high rates increases, and rate characteristics become a problem.

Thus, the present invention provides a carbon nanotube dispersion composition that achieves both fluidity and storage stability of the dispersion composition within a particle diameter range that exhibits a dispersion state of carbon nanotubes with excellent cycle characteristics when used in a secondary battery, i.e., with superior life performance. In addition, by using the carbon nanotube dispersion composition, the present invention provides a secondary battery that achieves both cycle characteristics and rate characteristics.

Furthermore, the present invention provides a secondary battery with excellent rate characteristics even in the case of using graphite powder and silicon-based active material as negative electrode active materials.

Means for Solving Problem

In other words, the present invention includes the following embodiments. The embodiments of the present invention are not limited to the following.

An embodiment relates to a carbon nanotube dispersion composition including carbon nanotubes (A), a dispersant (B), and a solvent (C). A particle diameter D50 at a cumulative volume of 50% according to laser diffraction particle size distribution measurement is 0.3 to 7 μm. The carbon nanotube dispersion composition satisfies (1) and (2) below.

(1) The dispersant (B) is a polymer that has a weight average molecular weight of 5,000 or more and 360,000 or less and includes a carboxyl group-containing structural unit derived from at least one of (meth) acrylic acid and (meth)acrylate having a carboxyl group, and a content ratio of the carboxyl group-containing structural unit is 80 mass % or more based on a mass of the polymer.

(2) In a case where the particle diameter D50 at a cumulative volume of 50% according to laser diffraction particle size distribution measurement of the carbon nanotube dispersion composition is X [μm], and a pH is Y, X and Y satisfy (Formula a) and (Formula b) below:

$$Y \geq -0.149X + 4.545 \qquad \text{(Formula a)}$$

$$Y \leq -0.134X + 5.140. \qquad \text{(Formula b)}$$

In the above embodiment, the carbon nanotube dispersion composition preferably further includes a basic compound (D).

Another embodiment relates to a mixture slurry including the carbon nanotube dispersion composition according to the above embodiment and an active material.

Another embodiment relates to an electrode film formed from the mixture slurry according to the above embodiment.

Another embodiment relates to a secondary battery including a positive electrode and a negative electrode, and at least one of the positive electrode and the negative electrode includes the electrode film according to the above embodiment.

Effects of Invention

According to the embodiments of the present invention, it becomes possible to provide excellent fluidity and storage stability in a carbon nanotube dispersion composition having a particle size distribution range that is expected to improve life performance of secondary batteries in particular. In addition, by using this carbon nanotube dispersion composition, it becomes possible to provide a secondary battery that achieves both cycle characteristics and rate characteristics.

Furthermore, in the case of using graphite powder and silicon-based active material as the negative electrode active material, even if expansion and contraction of the active material occur during charging and discharging, the conductive paths are sufficiently maintained due to uniform dispersion of carbon nanotubes in the mixture slurry. Accordingly, it becomes possible to suppress an increase in internal resistance within the electrode, reduce a decrease in charge-discharge capacity, and provide a secondary battery with excellent rate characteristics.

Embodiments for Implementing Invention

Hereinafter, a dispersion composition, a mixture slurry, an electrode film, and a secondary battery of embodiments of the present invention will be described in detail. The present invention is not limited to the following embodiments, and includes embodiments implemented within a range that does not change the gist of the present invention.

In this specification, a numerical value range specified using "A to B" includes numerical values "A" and "B" as a range of a lower limit value and an upper limit value.

In this specification, "carbon nanotubes" may be referred to as "CNT", "carbon nanotube dispersion composition" may be referred to as "dispersion composition" or "CNT dispersion composition", and "particle diameter $D_{50}$ at a cumulative volume of 50% according to laser diffraction particle size distribution measurement" may be referred to as "particle diameter $D_{50}$".

In this specification, unless otherwise specified, "(meth) acryl", "(meth)acryloyl", "(meth)acrylic acid", "(meth)acrylate", and "(meth)acryloyloxy" represent "acryl or methacryl", "acryloyl or methacryloyl", "acrylic acid or methacrylic acid", "acrylate or methacrylate", and "acryloyloxy or methacryloyloxy", respectively.

Unless specifically noted otherwise, various components described in this specification may be respectively used independently as one type or as a mixture of two or more types.

Numerical values specified in this specification are values obtained according to methods disclosed in the embodiment or Examples.

<1> Carbon Nanotube Dispersion Composition

The carbon nanotube dispersion composition of the present embodiment includes carbon nanotubes (A), a dispersant (B), and a solvent (C), where a particle diameter $D_{50}$ at a cumulative volume of 50% according to laser diffraction particle size distribution measurement is 0.3 to 7 μm, and (1) and (2) below are satisfied.

(1) The dispersant (B) is a polymer that has a weight average molecular weight of 5,000 or more and 360,000 or less and includes a carboxyl group-containing structural unit derived from at least one of (meth) acrylic acid and (meth)acrylate having a carboxyl group, and a content ratio of the carboxyl group-containing structural unit is 80 mass % or more based on a mass of the polymer.

(2) When the particle diameter $D_{50}$ at a cumulative volume of 50% according to laser diffraction particle size distribution measurement of the carbon nanotube dispersion composition is X [μm] and a pH is Y, X and Y satisfy (Formula a) and (Formula b) below.

$$Y \geq -0.149X + 4.545 \qquad \text{(Formula a)}$$

$$Y \leq -0.134X + 5.140 \qquad \text{(Formula b)}$$

As described above, the present inventors have found that the preferable range of the pH of the carbon nanotube dispersion composition tends to depend on the particle diameter $D_{50}$. For example, by adjusting the pH to be lower as the value of the particle diameter $D_{50}$ is larger, storage stability and fluidity can be improved.

In the carbon nanotube dispersion composition of the present embodiment, the particle diameter $D_{50}$ at a cumulative volume of 50% according to laser diffraction particle size distribution measurement, which is a dispersion particle diameter, is 0.3 to 7 μm. A carbon nanotube dispersion composition having such a particle size distribution range tends to be capable of easily providing a secondary battery with excellent cycle characteristics. The particle diameter $D_{50}$ above is preferably 0.35 μm or more, and more preferably 0.4 μm or more. In addition, the particle diameter $D_{50}$ above is preferably 6 μm or less, more preferably 5.5 μm or less, and even more preferably 5 μm or less.

The particle diameter $D_{50}$ correlates with the length of the carbon nanotubes in the dispersion composition, and the carbon nanotube dispersion composition (hereinafter also referred to as a dispersion composition) with the particle diameter $D_{50}$ within the above range has a good dispersion state of carbon nanotubes in the dispersion composition, exhibits excellent cycle characteristics, and easily extends a battery life. In the case where the particle diameter $D_{50}$ exceeds the above range, carbon nanotubes in an aggregated state exist, and in the case where the particle diameter $D_{50}$ is below the above range, since a large number of finely cut conductive materials are generated, there is a tendency that it becomes difficult to form an efficient conductive network.

The particle diameter $D_{50}$ above may be determined using a general laser diffraction particle size distribution measurement apparatus of a dynamic light scattering method, but more specifically, may be measured according to a method described in Examples.

The pH of the carbon nanotube dispersion composition of the present embodiment is within the range of "Y" defined by (Formula a) and (Formula b) above. The pH may be a value measured at 25° C. using, for example, a pH meter. In some embodiments, the pH of the carbon nanotube dispersion composition is preferably in the range of 3.5 or more and 5.1 or less, and more preferably in the range of 3.8 or more and 5.0 or less, when measured using a pH meter at 25° C. When the pH is within the above range, dispersibility of the dispersant (B) can be easily improved, and accordingly, there is a tendency of being capable of easily improving fluidity and dispersion stability of the dispersion composition.

Thus, the carbon nanotube dispersion composition of the present embodiment is a dispersion composition adjusted to a particle size distribution range that can be expected to provide a secondary battery with excellent cycle characteristics. By using the dispersant (B) sufficiently having carboxyl group and adjusting the pH of the dispersion composition to a specific range, both excellent fluidity and storage stability are realized. Furthermore, when an active material is added to the dispersion composition to form a mixture slurry, with the carbon nanotubes also uniformly distributed with respect to the active material, a decrease in a capacity retention rate can be suppressed.

To obtain the carbon nanotube dispersion composition of the present embodiment, an adjustment method of the pH is preferably applied to satisfy the range of "Y" defined by (Formula a) and (Formula b) above. The adjustment method of the pH is not particularly limited. For example, a method of adding a basic compound to the dispersion composition and adjusting the added amount thereof, or a method of using carbon nanotubes that exhibit acidity or basicity may be mentioned. The carbon nanotubes exhibiting acidity may be obtained, for example, by a method of introducing acidic functional groups to the carbon nanotubes through acid treatment. The carbon nanotubes exhibiting basicity may be obtained, for example, by a method of adjusting the amount of catalyst-derived metal remaining in the carbon nanotubes, or a method of pre-treating the carbon nanotubes with a basic compound (e.g., compounds containing alkali metals or alkaline earth metals, amine-based compounds, etc.).

In some embodiments, from the viewpoint of easy adjustment of the pH, a method using a basic compound is preferable, and a method of adding a basic compound to the dispersion composition is more preferable. By adjusting the added amount of the basic compound, the desired pH value can be easily obtained. Details of the basic compound will be described later as "basic compound (D)".

In the dispersion composition of the present embodiment, the dispersant (B) includes 80 mass % or more of the carboxyl group-containing structural unit. Thus, the pH of a solution in which the dispersant (B) is dissolved in a solvent (e.g., water, etc.) capable of dissolving the dispersant (B) exhibits acidity. More specifically, the pH value of the solution containing the dispersant (B) may be 2 or more and less than 7. By adjusting the pH of the solution containing the dispersant (B) to generate COO— groups (carboxylic acid anions), particles can be dispersed and stabilized by the electric repulsive force thereof. From this, the present inventors have found that in the carbon nanotube dispersion composition, by controlling the relationship between the pH and the particle diameter $D_{50}$ at a cumulative volume of 50% according to laser diffraction particle size distribution measurement, which is the dispersion particle diameter, the initial viscosity of the dispersion composition can be lowered, and both fluidity and dispersion stability of the dispersion composition can be achieved.

Without being bound by theory, the following reasons may be considered for the presence of a preferable range defined by (Formula a) and (Formula b) above in the relationship between the particle diameter $D_{50}$ above and the pH.

First, the smaller the dispersion particle diameter is, the higher the collision speed between particles due to Brownian motion becomes. Thus, it is inferred that more repulsive force due to electric repulsion by COO— groups is necessary for dispersion stabilization. In other words, for example, in the case where a basic compound is used to adjust the pH, the smaller the dispersion particle diameter is, the more basic compound needs to be added, resulting in a tendency for the pH to become higher. For dispersion stabilization, even in the case of a large dispersion particle diameter, electric repulsion of a specific level or more due to COO— groups is necessary.

On the other hand, since carboxyl groups have high affinity for carbon nanotubes (CNT), a dispersant containing much carboxyl group is more easily adsorbed onto CNT. For example, if the pH becomes too high due to excessive addition of a basic compound to the dispersion composition, the amount of the carboxyl group relatively decreases, and there is a risk that the dispersant may desorb from the CNT. Especially in the case where the dispersion particle diameter is large, the pH is preferably set to be lower because the mass of CNT particles in the dispersion composition becomes larger. By appropriately adjusting the pH according to the size of the dispersion particle diameter and increasing the adsorption force of the dispersant to the carbon nanotubes in this manner, the particle repulsive force due to the osmotic effect can be utilized, and as a result, it is thought that storage stability and fluidity can be enhanced.

The carbon nanotube dispersion composition of the present embodiment does not include an active material. In this specification, in the case where the carbon nanotube dispersion composition further includes an active material, it is defined as a mixture slurry.

In other words, the dispersion composition of the present embodiment refers to the state before the active material is added to the dispersion composition. In these respects, the dispersion composition is distinguished from the mixture slurry containing the active material. That is, the dispersion composition does not substantially include the active material. "Not substantially include" is a concept that excludes the state in which the active material is intentionally added to the dispersion composition. Specifically, with respect to the total mass of the dispersion composition, the content of the active material may be 1 mass % or less, 0.5 mass % or less, or 0.1 mass % or less, or may be 0 mass %. Details of the active material will be described later.

The dispersion composition of the present embodiment may be suitably used for forming an electrode for a secondary battery. However, the dispersion composition of the present embodiment is not limited to the application for a secondary battery, and may also be used for an energy storage device other than a secondary battery, for example, an electrode for an electric double layer capacitor, an electrode for a non-aqueous electrolyte capacitor, etc. In addition, it may also be used for applications such as antistatic materials for IC trays of plastic and rubber products and molded bodies of electronic component materials, electronic components, alternatives to transparent electrodes (ITO films), electromagnetic wave shielding, etc.

The constituent components of the carbon nanotube dispersion composition of the present embodiment will be described below.

<Carbon Nanotubes (A)>

The carbon nanotubes may be single-walled carbon nanotubes alone, multi-walled carbon nanotubes alone, or a mixture of single-walled carbon nanotubes and multi-walled carbon nanotubes. Single-walled carbon nanotubes have a structure in which a single layer of graphite is rolled up, and multi-walled carbon nanotubes have a structure in which two or three or more layers of graphite are rolled up.

The average outer diameter of the carbon nanotubes used as the raw material is preferably 1 nm or more and 50 nm or less, more preferably 1 nm or more and 40 nm or less, or even more preferably 1 nm or more and 20 nm or less. In these ranges, the filling density of the active material in the electrode film can be further enhanced. By using the carbon nanotubes in this range, bundles composed of several CNTs can be formed in the dispersion composition, and a dispersion composition with the preferable average outer diameter after dispersion can be obtained.

The average outer diameter of the carbon nanotubes used as the raw material is calculated by the following method.

First, carbon nanotubes are dispersed in toluene using an ultrasonic homogenizer, and then placed on a collodion film and dried. The carbon nanotubes are observed and imaged using a transmission electron microscope (TEM). Next, in the observed image, 100 carbon nanotubes are randomly selected, and their respective outer diameters are measured. Then, the average outer diameter (nm) of the raw material carbon nanotubes is calculated as a number average of the outer diameters.

The average fiber length of the carbon nanotubes used as the raw material is preferably 1 to 50 μm, and more preferably 1 to 20 μm. Within the above range, it is easy to adjust to a preferable fiber length after dispersion.

The fiber length of the carbon nanotubes used as the raw material may be measured by dispersing the carbon nanotubes in toluene using an ultrasonic homogenizer, then observing the carbon nanotubes deposited on a mica substrate with an SEM and analyzing the images. The SEM images are analyzed using image analysis software "Win-ROOF2015" (produced by Mitani Corporation), and the skeleton length of a single carbon nanotube is calculated as the fiber length. An average of the fiber lengths counted for 1000 to 3000 carbon nanotubes is taken as the average fiber length of the carbon nanotubes used as the raw material.

The BET specific surface area according to nitrogen adsorption measurement of the carbon nanotubes used as the raw material is preferably 100 $m^2/g$ or more and 1200 $m^2/g$ or less. When the BET specific surface area of the carbon nanotubes is within the above range, the carbon nanotubes can be easily distributed in the mixture slurry upon being controlled to an appropriate dispersion state, and the cycle characteristics can be further improved.

In the carbon nanotubes used as the raw material, in the Raman spectrum, when the maximum peak intensity in the range of 1560 to 1600 cm-1 is G, and the maximum peak intensity in the range of 1310 to 1350 cm-1 is D, a G/D ratio is preferably 0.5 or more and 100 or less, more preferably 0.8 or more and 50 or less, and even more preferably 1 or more and 45 or less.

In particular, in the case where the specific surface area is 100 $m^2/g$ or more and less than 700 $m^2/g$, the G/D ratio is preferably 0.8 or more and 8 or less, and more preferably 0.8 or more and 5 or less.

In the case where the specific surface area is 700 $m^2/g$ or more and 1200 $m^2/g$ or less, the G/D ratio is preferably 30 or more and 100 or less, and more preferably 40 or more and 50 or less.

When the G/D ratio of the carbon nanotubes is within the above range, crystallinity is high, and it becomes easy to obtain good conductivity, which is preferable. The reason that the preferable range differs depending on the specific surface area lies in that, in the case of small specific surface areas, the carbon nanotubes are mainly multi-walled CNTs, and since the D-band becomes stronger due to the influence of terminal sp3 hybridized carbon and interlayer, the G/D ratio range for good conductivity becomes small compared to carbon nanotubes of high specific surface areas. In the case of high specific surface areas, the carbon nanotubes are mainly single-walled CNTs, and the defects of sp2 carbon may be inferred from the G/D ratio. When within the above range, defects can decrease and good conductivity can be exhibited.

The volume resistivity of the carbon nanotubes used as the raw material is preferably $1.0 \times 10^{-3}$ Ω·cm or more and $3.0 \times 10^{-2}$ Ω·cm or less, and more preferably $1.0 \times 10^{-3}$ Ω·cm or more and $1.0 \times 10^{-2}$ Ω·cm or less.

The volume resistivity of the carbon nanotubes may be measured using a powder resistivity measurement apparatus (Loresta GP Powder Resistivity Measurement System MCP-PD-51 manufactured by Mitsubishi Chemical Analytech Co., Ltd.). When the volume resistivity of the carbon nanotubes is within the above range, the electron transfer resistance between the carbon nanotubes and the active material can be reduced.

The carbon purity of the carbon nanotubes used as the raw material is expressed as a content ratio (%) of carbon atoms in the carbon nanotubes. The carbon purity is preferably 80 mass % or more, more preferably 90 mass % or more, and even more preferably 95 mass % or more, with respect to 100 mass % of the carbon nanotubes. When the carbon purity of the carbon nanotubes is within the above range, it is possible to prevent problems such as formation of dendrites and short circuits caused by impurities such as metal catalysts.

The metal content in the carbon nanotubes used as the raw material is preferably less than 20 mass %, more preferably less than 10 mass %, and even more preferably less than 5 mass %, with respect to 100 mass % of the carbon nanotubes. The metal included in the carbon nanotubes may be metals or metal oxides used as catalysts during synthesis of carbon nanotubes, or metal powders mixed in due to wear of the apparatus, etc. Specifically, examples may include metals such as cobalt, nickel, aluminum, magnesium, silica, manganese, and molybdenum, alloys of these metals, metal oxides, and composite oxides thereof.

The carbon purity and the metal content in the carbon nanotubes can be determined by ICP emission spectroscopy.

The carbon nanotubes used as the raw material may be surface-treated carbon nanotubes. In addition, the carbon nanotubes may be carbon nanotube derivatives with functional groups, such as carboxyl groups, imparted thereto. In addition, carbon nanotubes encapsulating substances such as organic compounds or metal atoms may also be used.

The carbon nanotubes used as the raw material may be pulverization-treated carbon nanotubes. Pulverization treatment refers to pulverizing carbon nanotubes without substantially involving liquid substances, using a pulverization machine with built-in pulverization media such as beads or steel balls, and is also called dry pulverization. The pulverization is performed utilizing pulverization forces and destructive forces generated by collision of the pulverization media. The pulverization mainly has the effect of reducing the size of secondary particles of carbon nanotubes, and can improve dispersibility of the carbon nanotubes. The dry pulverization equipment may use conventional methods such as dry attritors, ball mills, vibration mills, and bead mills, and the pulverization time may be set in any manner depending on the equipment.

The carbon nanotubes used as the raw material may be carbon nanotubes produced by any method. Carbon nanotubes may generally be produced by a laser ablation method, an arc discharge method, a thermal CVD method, a plasma CVD method, and a combustion method, but are not limited thereto.

<Dispersant (B)>

The carbon nanotube dispersion composition of the present embodiment includes a dispersant (B). The dispersant has the function of stabilizing dispersion of CNT in the dispersion composition, and other dispersants may also be used in combination within ranges that do not impair the effect.

The dispersant (B) is a polymer having a weight average molecular weight of 5,000 or more and 360,000 or less and including a carboxyl group-containing structural unit. The content ratio of the carboxyl group-containing structural unit is 80 mass % or more based on the mass of the polymer.

By using such a dispersant (B) for dispersion of carbon nanotubes, a carbon nanotube dispersion composition that satisfies a specific particle diameter $D_{50}$ and is excellent in fluidity and storage stability can be easily obtained.

The weight average molecular weight of the dispersant (B) is 5,000 or more and 360,000 or less. The weight average molecular weight of the dispersant (B) is preferably 6,000 or more, and more preferably 8,000 or more. In addition, it is preferably 260,000 or less, and more preferably 100,000 or less.

In some embodiments, the weight average molecular weight of the dispersant (B) is preferably 9,000 or more, more preferably 10,000 or more, and even more preferably 50,000 or more. In addition, the weight average molecular weight of the dispersant (B) is preferably 90,000 or less, more preferably 80,000 or less, and even more preferably 70,000 or less.

With the weight average molecular weight within this range, adsorption to carbon nanotubes can be improved, and stability of the dispersion can be further improved.

In addition, the dispersant (B) is a polymer having a carboxyl group-containing structural unit, and the content ratio of the carboxyl group-containing structural unit is 80 mass % or more based on the mass of the polymer.

By having sufficient carboxyl group within the molecule, strong ionic properties are exhibited. Thus, adsorption to carbon nanotubes and affinity for the medium can be enhanced, and the carbon nanotubes can be present stably in the medium.

In some embodiments, the dispersant (B) is preferably a polymer of at least one of (meth)acrylic acid and (meth)acrylate having a carboxyl group. In other words, the dispersant (B) is preferably a polymer including a structural unit derived from at least one of (meth)acrylic acid and (meth)acrylate having a carboxyl group, and is more preferably a polymer including a structural unit derived from (meth)acrylic acid. In the case of using the above polymer as the dispersant (B), dispersibility of carbon nanotubes is excellent, and it becomes easier to further improve rate characteristics and cycle characteristics as a battery material.

In addition, the dispersant (B) is preferably a polymer having an alkylene structure in the main chain.

In this specification, the content ratio of each structural unit of the dispersant may be determined based on the mass % of the precursor (monomer) used in polymerization. Accordingly, the content ratio of the carboxyl group-containing structural unit to be described later refers to the content ratio of (meth)acrylic acid and/or (meth)acrylate having a carboxyl group, based on the total amount of monomers used to produce the dispersant (polymer).

From the viewpoint of providing appropriate affinity for the solvent to be described later, the content ratio of the carboxyl group-containing structural unit is preferably 90 mass % or more, and more preferably 95 mass % or more, in the case where the mass of the polymer (excluding the initiator and the chain transfer agent) is 100 mass %. On the other hand, the content ratio may be 98 mass % or less. In an embodiment, the content ratio may be 100 mass %. With the content ratio being 90 mass % or more, dispersion stabilization of CNT due to the electric repulsive force of the carboxyl group can be further expected.

In an embodiment, the dispersant (B) may further include one or more selected from the group consisting of a nitrile group-containing structural unit, a hydroxyl group-containing structural unit, and a heterocycle-containing structural unit, in addition to the carboxyl group-containing structural unit. In this manner, in the case where the dispersant (B) further includes one or more of the above structural units in addition to the carboxyl group-containing structural unit, polarization becomes stronger and affinity between the carbon nanotubes and the medium becomes higher, which is preferable.

[Carboxyl Group-Containing Structural Unit]

The carboxyl group-containing structural unit is a structural unit having a carboxyl group, and may be a structural unit having an alkylene structure substituted with a carboxyl group. The alkylene structure is preferably a linear or branched alkylene structure. The number of carboxyl groups in the carboxyl group-containing structural unit is preferably one or two, and is more preferably one.

The method of introducing the carboxyl group-containing structural unit into the polymer is not particularly limited. Examples may include a method of preparing the polymer by polymerization reaction of a monomer having a carboxyl group, more specifically (meth)acrylic acid or (meth)acrylate having a carboxyl group, etc. Another method may be a method of preparing the polymer by polymerization reaction of a monomer containing a functional group other than a carboxyl group, and then modifying the functional group to a carboxyl group. In particular, the method of preparing the polymer by polymerization reaction of a monomer having a carboxyl group may be preferably used.

Examples of the monomer having a carboxyl group may include unsaturated fatty acids such as (meth)acrylic acid, crotonic acid, itaconic acid, maleic acid, fumaric acid, citraconic acid, etc., (meth)acrylates having a carboxyl group such as 2-(meth)acryloyloxyethyl phthalate, 2-(meth) acryloyloxypropyl phthalate, 2-(meth)acryloyloxyethyl hexahydrophthalate, 2-(meth)acryloyloxypropyl hexahydrophthalate, ethylene oxide-modified succinic acid (meth) acrylate, β-carboxyethyl (meth)acrylate, etc. In addition, examples may include monomers having an acid anhydride group such as maleic anhydride, itaconic anhydride, citraconic anhydride, which are multimer of the above monomers having a carboxyl group, and monofunctional alcohol adducts thereof.

"—C(=O)—O—C(=O)—" (referred to as "acid anhydride group" in this specification), which is a group having a structure in which two carboxyl groups are dehydration-condensed, also forms a carboxyl group by hydrolysis. Thus, in this specification, it is included in the concept of carboxyl group. In addition, a carbamoyl group of a polymer obtained by polymerization reaction of a monomer having a carbamoyl group such as (meth)acrylamide may be hydrolyzed to be taken as a carboxyl group-containing structural unit.

As the monomer having a carboxyl group, which is a precursor of the carboxyl group-containing structural unit, unsaturated fatty acid is preferable, (meth)acrylic acid is more preferable, and acrylic acid is even more preferable, from the viewpoint of electrochemical stability. Acrylic acid is excellent in solubility in water and dispersibility of carbon nanotubes, and can further improve rate characteristics and cycle characteristics as a battery material, which is preferable.

[Nitrile Group-Containing Structural Unit]

The nitrile group-containing structural unit is a structural unit having a nitrile group, and may be a structural unit having an alkylene structure substituted with a nitrile group.

The alkylene structure is preferably a linear or branched alkylene structure. The number of nitrile groups in the nitrile group-containing structural unit is preferably one or two, and more preferably one.

The method of introducing the nitrile group-containing structural unit into the dispersant is not particularly limited. In an embodiment, for example, a polymer may be prepared by polymerization reaction of a monomer having a nitrile group.

Examples of the monomer having a nitrile group include acrylonitrile, methacrylonitrile, fumaronitrile, etc. One type of these may be used alone, or two or more types may be used in combination. In the case where the monomer having a nitrile group is acrylonitrile, there is less bending of the copolymer, and adjacent cyano groups are oriented to form a partial structure with strong polarization. Thus, the intermolecular force between the polymers or between the polymer and the carbon-based conductive material becomes higher. From the viewpoint of increasing the intermolecular force as described above, as well as from the viewpoint of ease of obtaining raw materials and reactivity, the monomer having a nitrile group is preferably acrylonitrile.

From the viewpoint of increasing the intermolecular force described above, the content ratio of the nitrile group-containing structural unit is preferably 3 mass % or more, and more preferably 5 mass % or more, in the case where the mass of the polymer is 100 mass %. On the other hand, the content ratio is preferably 20 mass % or less, and more preferably 10 mass % or less.

By adjusting the content ratio of the nitrile group-containing structural unit to the above range, the carbon nanotubes can be present more stably in the medium. In addition, in the case where such a polymer is used in a secondary battery, it is possible to prevent problems such as the dispersant dissolving in the electrolyte in the battery and increasing the resistance of the electrolyte.

[Hydroxyl Group-Containing Structural Unit]

The hydroxyl group-containing structural unit is a structural unit having a hydroxyl group, and may be a structural unit having an alkylene structure substituted with a hydroxyl group. The alkylene structure is preferably a linear or branched alkylene structure. The number of hydroxyl groups in the hydroxyl group-containing structural unit is preferably one or two, and more preferably one.

The method of introducing the hydroxyl group-containing structural unit into the polymer is not particularly limited. Examples may include a method of preparing a polymer by polymerization reaction of a monomer having a hydroxyl group, or a method of preparing a polymer by polymerization reaction of a monomer having a functional group other than a hydroxyl group and then modifying to a hydroxyl group. A rational method may be selected from the viewpoint of reactivity and raw material price.

Examples of the monomer having a hydroxyl group include 2-hydroxyethyl (meth)acrylate, 3-hydroxypropyl (meth)acrylate, 4-hydroxybutyl (meth)acrylate, glycerol mono(meth)acrylate, 4-hydroxyvinylbenzene, 2-hydroxy-3-phenoxypropyl acrylate, or caprolactone adducts of these monomers (the addition mole number is 1 to 5). As the monomer containing a hydroxyl group, hydroxyalkyl (meth) acrylate is preferable, 2-hydroxyethyl (meth)acrylate is more preferable, and 2-hydroxyethyl acrylate is even more preferable.

Examples of the method of preparing a polymer by polymerization reaction of a monomer having a functional group other than a hydroxyl group and then modifying to a hydroxyl group may include a method of saponifying, with an alkali such as sodium hydroxide, the acetyl group of polyvinyl acetate obtained by polymerizing vinyl acetate to form a hydroxyl group (saponification reaction). The reaction rate of saponification (degree of saponification) may be controlled in any manner by changing the concentration of sodium hydroxide and the treatment time.

In addition, to enhance affinity between the carbon nanotubes and the medium, at least a part of the hydroxyl group in the polymer may be reacted with an aldehyde compound and modified to an acetal group for use (acetalization).

The aldehyde compound used for the acetalization reaction may be, for example, linear, branched, cyclic saturated, unsaturated, or aromatic aldehyde compounds having 1 to 15 carbon atoms, but is not limited thereto. Specifically, examples may include formaldehyde, acetaldehyde, propionyl aldehyde, n-butyl aldehyde, isobutyl aldehyde, tert-butyl aldehyde, benzaldehyde, and cyclohexyl aldehyde. These aldehyde compounds may be used alone or in combination as two or more types. In addition, these aldehyde compounds, except for formaldehyde, may have one or more hydrogen atoms substituted with halogens, etc. From the viewpoint of versatility, linear, branched, cyclic saturated, unsaturated, or aromatic aldehyde compounds having 1 to 10 carbon atoms are preferable, and linear aldehyde compounds having 1 to 4 carbon atoms are more preferable. The reaction rate of acetalization (degree of acetalization) may be controlled in any manner by changing the aldehyde compound used and the treatment time.

To enhance polarization and increase affinity for the carbon nanotubes and the medium, and from the viewpoint of resistance to electrolyte, the content ratio of the hydroxyl group-containing structural unit is preferably 3 mass % or more, and more preferably 5 mass % or more, in the case where the mass of the polymer is 100 mass %. On the other hand, the content ratio is preferably 20 mass % or less, and more preferably 10 mass % or less.

In addition, in the case where the hydroxyl group-containing structural unit is acetalized and has an acetal group, for similar reasons, the content ratio of the acetal group-containing structural unit is preferably 3 mass % or more, and more preferably 5 mass % or more, in the case where the mass of the polymer is 100 mass %. On the other hand, the content ratio is preferably 20 mass % or less, and more preferably 10 mass % or less.

Furthermore, in the case of containing one or more selected from the group consisting of the nitrile group-containing structural unit and the heterocycle-containing structural unit, the content ratio of the hydroxyl group-containing structural unit is preferably 1 mass % or more, and more preferably 3 mass % or more. On the other hand, the content ratio is preferably 10 mass % or less, and more preferably 5 mass % or less. By adjusting to the above range, polarization can be enhanced, and affinity for the carbon nanotubes and the medium can be increased. In addition, it is also preferable from the viewpoint of resistance to electrolyte.

When one or more selected from the group consisting of the nitrile group-containing structural unit and the heterocycle-containing structural unit are further included, polarization is further enhanced, which is particularly preferable.

[Heterocycle-Containing Structural Unit]

The heterocycle-containing structural unit is a structural unit having a heterocycle, and may be a structural unit having an alkylene structure substituted with a substituent having a heterocycle. The alkylene structure is preferably a linear or branched alkylene structure. The heterocycle included in the heterocycle-containing structural unit may be a monocyclic structure or a fused ring structure, but a monocyclic structure is preferable. In addition, the number of heterocycles in the heterocycle-containing structural unit is preferably one or two, and more preferably one.

The heterocycle includes atoms other than carbon as atoms constituting the ring and, for example, includes one or two or more nitrogen atoms, oxygen atoms, sulfur atoms, etc. As the atoms other than carbon constituting the ring, nitrogen atoms or oxygen atoms are preferable, and nitrogen atoms are more preferable. By including atoms other than carbon as atoms constituting the ring, polarization occurs within the heterocycle, enabling strong effect on the carbon nanotubes.

In addition, the method of introducing the heterocycle into the polymer is not particularly limited. For example, a method of preparing the polymer by polymerization reaction of a monomer having a heterocycle may be used.

As the monomer having a heterocycle, N-vinyl cyclic amide structural units are preferable, and examples may include N-vinyl-2-pyrrolidone, N-vinyl-ε-caprolactam, N-vinyl-2-piperidone, N-vinyl-3-morpholinone, N-vinyl-1, 3-oxazin-2-one, N-vinyl-3,5-morpholinedione, etc. In particular, N-vinyl-2-pyrrolidone is preferable from the viewpoint of improving battery characteristics. These may be used alone or as a combination of two or more types.

From the viewpoint of enhancing polarization as described above and enhancing the effect on the carbon nanotubes, the content ratio of the heterocycle-containing structural unit is preferably 3 mass % or more, and more preferably 5 mass % or more, in the case where the mass of the polymer is 100 mass %. On the other hand, the content ratio is preferably 20 mass % or less, and more preferably 15 mass % or less.

However, in the case where at least any one of the nitrile group-containing structural unit and the hydroxyl group-containing structural unit is further included, the content ratio of the heterocycle-containing structural unit is preferably 1 mass % or more, and more preferably 3 mass % or more, based on the mass of the polymer. On the other hand, the content ratio is preferably 20 mass % or less, and more preferably 15 mass % or less.

In the case where at least any one of the nitrile group-containing structural unit and the hydroxyl group-containing structural unit is further included, it is more preferable because the polarity increases, and the resistance to the electrolyte solution can be improved.

[Other Structural Units]

As other structural units, the polymer may further have one or more of structural units selected from the group consisting of active hydrogen group-containing structural units (excluding carboxyl groups and hydroxyl groups), basic group-containing structural units, and ester group-containing structural units. By selecting and including the above structural units according to characteristics such as hydrophilicity, hydrophobicity, acidity, and basicity of the substrate to which the carbon nanotube dispersion composition of the present embodiment is applied, or the material to be mixed, it is possible to be easily applied to various applications.

From the viewpoint of not impairing polarization of the dispersant, the content of the other structural units is preferably 20 mass % or less, more preferably 10 mass % or less, and even more preferably 5 mass % or less, in the case where the mass of the polymer is 100 mass %.

The active hydrogen group-containing structural unit is a structural unit having, for example, a primary amino group, a secondary amino group, a mercapto group, etc. as the active hydrogen group. Herein, "primary amino group" means —$NH_2$ (amino group), and "secondary amino group" means a group in which one hydrogen atom on the primary amino group is substituted with an organic residue such as an alkyl group. However, in this specification, primary amino groups and secondary amino groups in acid amides are not included in the active hydrogen groups.

The basic group-containing structural unit is a structural unit having a basic group. Examples of the basic group may include tertiary amino groups and amide groups. Structural units having primary amino groups and structural units having secondary amino groups are also included in the basic group-containing structural unit. However, in the present disclosure, they are treated as the active hydrogen group-containing structural unit and are not included in the basic group-containing structural unit.

The ester group-containing structural unit is a structural unit having a structure represented by $(R^1)_2C=C-CO-O-R^2$. In the above formula, $R^1$ is a hydrogen atom or a methyl group, and at least one of them is a hydrogen atom. $R^2$ is an alkyl group which may have a substituent.

Those containing the above active hydrogen group or the above basic group as a substituent of the alkyl group are treated as the above active hydrogen group-containing structural unit or the above basic group-containing structural unit, and are not included in the ester group-containing structural unit.

In an embodiment, the combination of structural units included in the polymer is preferably the carboxyl group-containing structural unit alone, and one or more selected from the group consisting of carboxyl group-containing structural unit/nitrile group-containing structural unit, hydroxyl group-containing structural unit, and heterocycle-containing structural unit, and is more preferably one selected from the group consisting of carboxyl group-containing structural unit alone, carboxyl group-containing structural unit/nitrile group-containing structural unit, and carboxyl group-containing structural unit/nitrile group-containing structural unit/hydroxyl group-containing structural unit.

Among these, it is preferable to have carboxyl group-containing structural unit alone, or the combination of carboxyl group-containing structural unit/nitrile group-containing structural unit.

The production method of the polymer is not particularly limited. Examples may include solution polymerization, suspension polymerization, bulk polymerization, emulsion polymerization, precipitation polymerization, etc. Among these, solution polymerization or precipitation polymerization is preferable. Examples of the polymerization reaction system may include addition polymerization such as ionic polymerization, free radical polymerization, and living radical polymerization. Among these, free radical polymerization or living radical polymerization is preferable. In addition, examples of the radical polymerization initiator include peroxides, azo-based initiators, etc.

In the case of performing radical polymerization, examples of the polymerization initiator include, but are not limited to, the following:

organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethyl-hexanoate, 1,1-bis(t-butylperoxy)-3,3,5-trimethylcyclohexane, 1,1-bis(t-butylperoxy)cyclohexane, etc., and common azo-based radical polymerization initiators such as azobisisobutyronitrile, azobisvaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, 2,2'-azobis-2-methylbutyronitrile, etc.

These may be used as one type alone or as a combination of two or more types. These radical polymerization initiators may also be combined with appropriate reducing agents to be used as redox initiators.

It is common to use these polymerization initiators in a blending amount of 1 part by mass or less with respect to 100 parts by mass of the total mass of all the monomer used. The blending amount of the polymerization initiator may be appropriately selected in consideration of the temperature at which polymerization is performed and the half-life of the polymerization initiator.

In the production process of the polymer, it is possible to control the molecular weight of the produced polymer using a chain transfer agent, etc., within ranges that do not hinder the objective of the present invention. Examples of the chain transfer agent may include alkyl mercaptans such as octyl mercaptan, nonyl mercaptan, decyl mercaptan, dodecyl mercaptan, 3-mercapto-1,2-propanediol, etc., thioglycolic acid esters such as octyl thioglycolate, nonyl thioglycolate, 2-ethylhexyl thioglycolate, etc., and 2,4-diphenyl-4-methyl-1-pentene, 1-methyl-4-isopropylidene-1-cyclohexene, α-pinene, β-pinene, etc.

From the viewpoint of handling and stability, in particular, 3-mercapto-1,2-propanediol, thioglycolic acid esters, 2,4-diphenyl-4-methyl-1-pentene, 1-methyl-4-isopropylidene-1-cyclohexene, α-pinene, β-pinene, etc. are preferable. In the case where the above compounds are used, it is also preferable in that the obtained polymer has low odor. In an embodiment, the chain transfer agent is preferably one of the above compounds used alone, or two or more types used in combination.

The chain transfer agent may be appropriately added according to the required molecular weight. Generally, it is preferably used in the range of 0.001 to 4 parts by mass with respect to 100 parts by mass of the total mass of all the monomer used. In an embodiment, the blending amount of the above chain transfer agent is preferably 0.01 to 4 parts by mass, and more preferably 0.1 to 2 parts by mass. By configuring the chain transfer agent in the above range, the molecular weight of the polymer used as the dispersant in the present embodiment can be easily adjusted to a suitable range.

In addition, examples of other molecular weight control methods may include a method of changing the polymerization method, a method of adjusting the amount of the polymerization initiator, a method of changing the polymerization temperature, etc. These molecular weight control methods may be used as one method alone or as a combination of two or more methods.

The molecular weight may be measured, for example, by gel permeation chromatography (GPC) equipped with an RI detector and a UV detector (210 nm) according to the following method.

A specific example of the apparatus that may be used for measurement is HLC-8320GPC (manufactured by Tosoh Corporation), and the measurement may be performed according to the following.

Separation column: the following are sequentially disposed in series.
TSKgel Guardcolumn PWXL (6.0 mm I.D.×4 cm)
Two columns of TSKgel GMPXL (7.8 mm I.D.×30 cm)
Column temperature: 40° C.
Eluent: 0.2 M phosphate buffer solution (pH 7.0)
Flow rate: 1.0 mL/min The sample is prepared at a concentration of 0.1 mass % in a mixed solution composed of the above eluent, and 0.1 mL is injected. The molecular weight is determined as a converted value using standard PEO/PEG (Agilent Technologies).

In some embodiments, the acid value of the dispersant including the carboxyl group-containing structural unit may be preferably 400 mgKOH/g to 800 mgKOH/g, more preferably 500 mgKOH/g to 800 mgKOH/g, and even more preferably 600 mgKOH/g to 800 mgKOH/g.

In the case where the acid value of the dispersant is within the above range, there is a tendency that it becomes easy to maintain a good dispersion state because adsorption to CNT can be easily enhanced, and good solubility in the solvent, which serves as the dispersion medium, can be easily obtained. The above dispersion medium (solvent) includes water, and may further include other media having affinity for water as needed. In the case where the acid value of the dispersant becomes less than 400 mgKOH/g, dispersion stability tends to become poor due to a decrease in the electric repulsion sites of COO—. On the other hand, in the case where the acid value of the dispersant exceeds 900 mgKOH/g, it may cause corrosion of the apparatus used during the dispersion treatment.

The acid value is a numerical value measured according to Japanese Industrial Standards "K0070:1992. Test methods for acid value, saponification value, ester value, iodine value, hydroxyl value and unsaponifiable matter of chemical products", and refers to the amount (mg) of potassium hydroxide required to completely neutralize 1 g of the resin component.

In the carbon nanotube dispersion composition, the above polymer functions as a dispersant. From such a viewpoint, the content of the dispersant (B) in the carbon nanotube dispersion composition is preferably determined according to the specific surface area and wettability of the carbon nanotubes.

In an embodiment, the content of the dispersant (B) is preferably 15 parts by mass or more, more preferably 20 parts by mass or more, with respect to 100 parts by mass of the carbon nanotubes. On the other hand, the content is preferably 160 parts by mass or less, more preferably 140 parts by mass or less, and even more preferably 90 parts by mass or less.

If the content is equal to or more than the lower limit value, the dispersant amount becomes appropriate, and occurrence of aggregation of the carbon nanotubes is further suppressed. With the content being equal to or less than the upper limit value, a decrease in fluidity due to increased viscosity of the dispersion composition caused by an excessive amount of the polymer component is prevented, and deterioration of storage stability is suppressed, which is preferable. There is an appropriate amount of the content of the dispersant (B) corresponding to the specific surface area of the carbon nanotubes, and the dispersant amount is preferably increased within the preferable range together with the increase in the specific surface area. For example, when the BET specific surface area according to nitrogen adsorption measurement of the carbon nanotubes used as the raw material is 100 $m^2/g$ or more and 1200 $m^2/g$ or less, the content of the dispersant (B) is preferably 15 to 160 parts by mass with respect to 100 parts by mass of the carbon nanotubes.

<Solvent (C)>

The dispersion composition of the present embodiment includes a solvent.

The solvent is not particularly limited, but includes water, and may further include other media with affinity for water as needed.

Examples of the other media with affinity for water may include ethanol, propanol, isopropanol, butanol, octyl alcohol, hexadecyl alcohol, acetylene alcohol, ethylene glycol monobutyl ether, methyl cellosolve, butyl cellosolve, propylene glycol monomethyl ether, acetylene glycol, polyoxyalkylene glycol, propylene glycol, other glycols, etc.

<Basic Compound (D)>

The dispersion composition of the present embodiment may apply any method to obtain a desired pH value, but a basic compound may be suitably used. Accordingly, in an embodiment, the dispersion composition includes a basic compound (D). With the dispersion composition including the basic compound (D), interaction occurs with strong polarization with the carboxyl group of the dispersant (B), an electric repulsive force is generated, and fluidity and storage stability of the dispersion composition can be easily improved. Examples of the basic compound (D) to be added may include inorganic bases, inorganic metal salts, organic bases, and organic base salts. Among these, inorganic bases or inorganic metal salts with larger polarization are preferable because effect can be exerted with a small amount of addition.

The basic compound may be added during dispersion, or may be added immediately after end of dispersion and thoroughly mixed and stirred. Among them, in the case of adding during dispersion, the dispersion rate of the dispersant (B) can be accelerated, which is preferable.

Examples of inorganic bases and inorganic metal salts may include chlorides, hydroxides, carbonates, nitrates, sulfates, phosphates, tungstates, vanadates, molybdates, niobates, borates, of alkali metals or alkaline earth metals; and ammonium hydroxide. Among these, from the viewpoint of being capable of easily supplying cations, hydroxides, carbonates, and alkoxides of alkali metals or alkaline earth metals are preferable.

Examples of hydroxides of alkali metals may include lithium hydroxide, sodium hydroxide, potassium hydroxide, etc. Examples of carbonates of alkali metals may include sodium carbonate, potassium carbonate, etc. Examples of hydroxides of alkaline earth metals may include calcium hydroxide, magnesium hydroxide, etc. Among these, it is more preferable to use at least one selected from the group consisting of sodium hydroxide, sodium carbonate, potassium hydroxide, and potassium carbonate. The metal included in the inorganic base may also be a transition metal.

Examples of alkoxides of alkali metals may include lithium methoxide, lithium ethoxide, lithium n-butoxide, lithium t-butoxide, potassium methoxide, potassium ethoxide, potassium n-butoxide, potassium t-butoxide, sodium methoxide, sodium ethoxide, sodium n-butoxide, sodium t-butoxide, etc. The number of carbon atoms in the alkoxide may be 5 or more. In particular, sodium t-butoxide is preferable.

Examples of alkoxides of alkaline earth metals may include magnesium methoxide, magnesium ethoxide, magnesium n-butoxide, magnesium t-butoxide, etc. The number of carbon atoms in the alkoxide may be 5 or more.

Among these, lithium hydroxide, sodium hydroxide, potassium hydroxide, lithium carbonate, sodium carbonate, lithium t-butoxide, potassium t-butoxide, and sodium t-butoxide are more preferable. Sodium hydroxide, sodium carbonate, potassium hydroxide, and potassium carbonate are even more preferable. Sodium hydroxide and sodium carbonate are most preferable. In the present embodiment, the metal included in the inorganic base and the inorganic metal salt may also be a transition metal.

Examples of organic bases may include primary, secondary, and tertiary amine compounds (alkylamines, amino alcohols, etc.) with 1 to 40 carbon atoms, which may have substituents, organic hydroxides, or organic metal salts.

Examples of organic bases may include primary, secondary, and tertiary alkylamines with 1 to 40 carbon atoms having alkyl groups which may be substituted, or compounds containing basic nitrogen atoms thereof.

Examples of primary alkylamines with 1 to 40 carbon atoms having alkyl groups which may be substituted may include propylamine, butylamine, isobutylamine, octylamine, 2-ethylhexylamine, laurylamine, stearylamine, oleylamine, 2-aminoethanol, 3-aminopropanol, 3-ethoxypropylamine, 3-lauryloxypropylamine, etc.

Examples of secondary alkylamines with 1 to 40 carbon atoms having alkyl groups which may be substituted may include dibutylamine, diisobutylamine, N-methylhexylamine, dioctylamine, distearylamine, 2-methylaminoethanol, etc.

Examples of tertiary alkylamines with 1 to 40 carbon atoms having alkyl groups which may be substituted may include triethylamine, tributylamine, N,N-dimethylbutylamine, N,N-diisopropylethylamine, dimethyloctylamine, tri-n-butylamine, dimethylbenzylamine, trioctylamine, dimethyldecylamine, dimethyllaurylamine, dimethylmyristylamine, dimethylpalmitylamine, dimethylstearylamine, dilaurylmonomethylamine, triethanolamine, 2-(dimethylamino) ethanol, etc.

Among these, primary, secondary, or tertiary alkylamines with 1 to 30 carbon atoms having alkyl groups which may be substituted are preferable, and primary, secondary, or tertiary alkylamines with 1 to 20 carbon atoms having alkyl groups which may be substituted are more preferable.

The "alkyl groups which may be substituted" means that hydrogen atoms may be substituted, and examples of the substituent may include hydroxyl groups.

Examples of other compounds containing basic nitrogen atoms may include 1,8-diazabicyclo[5.4.0]undec-7-ene (DBU), 1,5-diazabicyclo[4.3.0]non-5-ene (DBN), 1,4-diazabicyclo[2.2.2]octane (DABCO), imidazole, 1-methylimidazole, etc.

The content ratio of the basic compound (D) is preferably 0.01 mass % or more, and more preferably 0.02 mass % or more, based on the mass of the dispersion composition. In addition, the content ratio is preferably 0.40 mass % or less, more preferably 0.20 mass % or less, and even more preferably 0.15 mass % or less.

When the content ratio of the basic compound (D) is 0.01 mass % or more, there is a tendency to easily obtain the effect of storage stability. In addition, when the content ratio of the basic compound is 0.40 mass % or less, detachment of the dispersant from the carbon nanotubes can be suppressed, and causing of corrosion of the dispersion apparatus and/or inside of the battery can be further prevented, which is preferable.

<Other Optional Components>

The carbon nanotube dispersion composition of the present embodiment may appropriately include, as needed, other carbon-based conductive materials such as carbon black other than the carbon nanotubes (A), dispersants other than the dispersant (B), binders, surfactants, other additives, etc. within ranges that do not hinder the objective of the present invention. These components may be added at any timing, such as before dispersion, during dispersion, or after dispersion of the dispersion composition, or during preparation of the mixture slurry.

The carbon nanotube dispersion composition of the present embodiment is not particularly limited as long as dispersion of the carbon nanotubes can be stabilized, and in addition to the dispersant (B), surfactants and other dispersants may be used during dispersion of the carbon nanotubes.

[Surfactant]

Surfactants are mainly classified into anionic, cationic, nonionic, and amphoteric types. A surfactant of an appropriate type may be used in an appropriate blending amount according to the characteristics required for dispersion of the carbon nanotubes.

In the case of selecting an anionic surfactant, its type is not particularly limited. Specifically, examples may include fatty acid salts, polysulfonic acid salts, polycarboxylic acid salts, alkyl sulfate ester salts, alkylarylsulfonic acid salts, alkylnaphthalenesulfonic acid salts, dialkylsulfonic acid salts, dialkylsulfosuccinic acid salts, alkyl phosphate salts, polyoxyethylene alkyl ether sulfate salts, polyoxyethylene alkylaryl ether sulfate salts, naphthalene sulfonic acid formalin condensates, polyoxyethylene alkyl phosphate sulfonic acid salts, glycerol borate fatty acid esters, polyoxyethylene glycerol fatty acid esters, but are not limited thereto. Furthermore, specifically, examples may include sodium dodecylbenzenesulfonate, sodium lauryl sulfate, sodium polyoxyethylene lauryl ether sulfate, polyoxyethylene nonylphenyl ether sulfate ester salt, and sodium salt of β-naphthalene sulfonic acid formalin condensate, but are not limited thereto.

In addition, as a cationic surfactant, there are alkylamine salts and quaternary ammonium salts. Specifically, examples may include stearylamine acetate, trimethyl coconut ammonium chloride, trimethyl tallow ammonium chloride, dimethyl dioleyl ammonium chloride, methyl oleyl diethanol chloride, tetramethylammonium chloride, lauryl pyridinium chloride, lauryl pyridinium bromide, lauryl pyridinium disulfate, cetyl pyridinium bromide, 4-alkylmercaptopyridine, poly(vinylpyridine)-dodecyl bromide, and dodecylbenzyltriethylammonium chloride, but are not limited thereto. In addition, examples of an amphoteric surfactant may include amino carboxylic acid salts, but are not limited thereto.

In addition, examples of a nonionic surfactant may include polyoxyethylene alkyl ethers, polyoxyalkylene derivatives, polyoxyethylene phenyl ethers, sorbitan fatty acid esters, polyoxyethylene sorbitan fatty acid esters, and alkyl aryl ethers, but are not limited thereto. Specifically, examples may include polyoxyethylene lauryl ether, sorbitan fatty acid esters, and polyoxyethylene octylphenyl ether, but are not limited thereto.

The selected surfactant is not limited to a single surfactant. Thus, it is also possible to use a combination of two or more surfactants. For example, a combination of an anionic surfactant and a nonionic surfactant, or a combination of a cationic surfactant and a nonionic surfactant may be used. In such cases, the blending amounts are preferably configured to blending amounts appropriate for the respective surfactant components. The combination is preferably a combination of an anionic surfactant and a nonionic surfactant. The anionic surfactant is preferably a polycarboxylic acid salt. The nonionic surfactant is preferably a polyoxyethylene phenyl ether.

[Other Dispersants]

As dispersants used for dispersion of the carbon nanotubes, in addition to the dispersant (B), other dispersants such as resin-type dispersants may also be used.

Specifically, examples of the resin-type dispersant may include fluorine-based resins, polyvinyl alcohol, polyvinyl butyral, polyvinylpyrrolidone, etc. Particularly, polyvinyl alcohol and polyvinylpyrrolidone are preferable. The molecular weight of the resin-type dispersant is preferably 10,000 to 300,000.

[Binder]

The binder is a resin capable of binding between substances such as carbon-based conductive materials and other particles, and is further added to the dispersion liquid after dispersing the carbon nanotubes. In other words, it has a different role from the dispersant described in this specification. The same materials as the dispersant described above may be used as the binder.

In the case of using the carbon nanotube dispersion composition for a secondary battery, there is no particular restriction on the binder as long as it is commonly used for a secondary battery, and the binder may be appropriately selected according to the objective.

Examples of the binder used for a secondary battery may include: polymers or copolymers containing structural units such as ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, vinylpyrrolidone, etc.; polyurethane resins, polyester resins, phenolic resins, epoxy resins, phenoxy resins, urea resins, melamine resins, alkyd resins, acrylic resins, formaldehyde resins, silicone resins, fluorine resins; cellulose resins (e.g., carboxymethyl cellulose (CMC)); elastomers such as styrene-butadiene rubber and fluorine rubber; conductive resins such as polyaniline, polyacetylene, etc.

In addition, modified products, mixtures, and copolymers of these resins may also be used. Among these, in the case of using as a binder of a positive electrode, polymers or copolymers having fluorine atoms in the molecule, e.g., polyvinylidene fluoride, polyvinyl fluoride, tetrafluoroethylene, etc., are preferable from the viewpoint of resistance. In addition, in the case of using as a binder of a negative electrode, carboxymethyl cellulose, styrene-butadiene rubber, polyacrylic acid, etc., which have good adhesion properties, are preferable.

<Production Method of Dispersion Composition>

The production method of the dispersion composition includes: a process I of performing a dispersion treatment on a mixture of carbon nanotubes (A), a dispersant (B), and a solvent (C), and further a basic compound (D) as needed, to adjust a particle diameter $D_{50}$ at a cumulative volume of 50% according to laser diffraction particle size distribution measurement to a range of 0.3 to 7 μm; and a process II of adjusting a pH of the mixture to a range of (Formula a) and (Formula b) below. In (Formula a) and (Formula b) below, X is the particle diameter $D_{50}$ [μm] at a cumulative volume of 50% according to laser diffraction particle size distribution measurement after the dispersion treatment, and Y is the pH.

$$Y \geq -0.149X + 4.545 \qquad \text{(Formula a)}$$

$$Y \leq -0.134X + 5.140 \qquad \text{(Formula b)}$$

In the above production method, the process I and the process II may be implemented consecutively as independent processes, or may be implemented simultaneously without distinguishing between them. For example, in the case of using the basic compound (D) as a method of adjusting the pH, the process I and the process II may be implemented simultaneously.

Hereinafter, a method of dispersing carbon nanotubes in a solvent will be described as an example of the production method of the dispersion composition. The dispersion composition is preferably produced by, for example, performing a dispersion treatment and finely dispersing carbon nanotubes (A), a dispersant (B), and a solvent (C), and further a basic compound (D) as needed, using a dispersion apparatus. In the dispersion treatment, the timing of addition of the materials to be used may be adjusted in any manner, and multiple-stage treatments of two or more times may be applied.

Examples of the dispersion apparatus may include a kneader, a two-roll mill, a three-roll mill, a planetary mixer, a ball mill, a horizontal sand mill, a vertical sand mill, an annular bead mill, an attritor, a high-shear mixer, a high-pressure homogenizer, an ultrasonic homogenizer, etc. Among these, a high-shear mixer, a high-pressure homogenizer, an ultrasonic homogenizer, or a combination thereof is preferably used to finely disperse the carbon nanotubes in the dispersion composition and obtain suitable dispersibility. In particular, it is preferable to use a high-shear mixer in an initial process of dispersion from the viewpoint of promoting wetting of the carbon nanotubes and breaking up coarse particles, and next, use a high-pressure homogenizer from the viewpoint of dispersing while maintaining the aspect ratio of the carbon nanotubes. When using a high-pressure homogenizer, the pressure is preferably 40 to 150 MPa, and more preferably 70 to 150 MPa.

The dispersion method using the dispersion apparatus include batch-type dispersion, pass-type dispersion, circulation dispersion, etc., but any of the methods may be used, and two or more methods may be combined. The batch-type dispersion is a method of performing dispersion using only a main body of the dispersion apparatus without using piping or the like. Since handling is simple, small-amount production is preferable. The pass-type dispersion is a dispersion method in which the main body of the dispersion apparatus includes a tank supplying a dispersion liquid (mixture containing a dispersoid and a dispersion medium, which is a precursor of the dispersion composition) via piping, and a tank receiving the dispersion liquid, and the dispersion liquid is passed through the main body of the dispersion apparatus. In addition, the circulation-type dispersion is a method in which the dispersion liquid that has passed through the main body of the dispersion apparatus is returned to the tank supplying the dispersion liquid, and dispersion is performed while performing circulation.

In all of the methods, dispersion progresses as the treatment time is increased. Thus, the pass or the circulation may be repeated until the desired dispersion state is achieved, and the treatment volume can be increased by changing the tank size or the treatment time. The pass-type dispersion is preferable in that it is easier to uniformize the dispersion state compared to the circulation-type dispersion. The circulation-type dispersion is preferable in that the work and the production equipment are simpler compared to the pass-type dispersion. In the dispersion process, breakdown of agglomerated particles, unraveling, wetting, stabilization, etc. of carbon nanotubes proceed sequentially or simultaneously, and since the finished dispersion state differs depending on the approach of proceeding, it is preferable to manage the dispersion state in each dispersion process according to various evaluation methods.

In the dispersion composition of the present embodiment, the content ratio of the carbon nanotubes is preferably 0.3 mass % or more, more preferably 0.4 mass % or more, and even more preferably 0.5 mass % or more, based on 100 mass % of the dispersion composition. In addition, the content ratio is preferably 6.0 mass % or less, and more preferably 5.0 mass % or less. By configuring a content ratio equal to or more than the lower limit value, the pressure exerted by the carbon nanotube dispersion composition in the formulation design of the mixture slurry can be suppressed, and by configuring a content ratio equal to or less than the upper limit value, fluidity and handling properties of the dispersion composition can be ensured, which is preferable.

The average outer diameter of the carbon nanotubes in the carbon nanotube dispersion composition of the present embodiment is preferably 1 nm or more and 100 nm or less, more preferably 1.5 nm or more and 70 nm or less, and even more preferably 2 nm or more and 50 nm or less. If the average outer diameter is equal to or more than the lower limit value, fiber breakage can be prevented, and a volume change associated with absorption and release of lithium ions to the active material can be followed, which is preferable. If the average outer diameter is equal to or less than the upper limit value, the number of fibers becomes sufficient with respect to the amount added to the electrode, which is preferable.

The average fiber length of the carbon nanotubes in the carbon nanotube dispersion composition of the present embodiment is preferably 0.3 μm or more and 50 μm or less, and more preferably 0.5 μm or more and 20 μm or less. If the average fiber length is equal to or more than the lower limit value, conductive paths between the active materials can be sufficiently formed, which is preferable. If the average fiber length is equal to or less than the upper limit value, entanglement between the carbon nanotubes in the electrode and location can be suppressed, and deterioration of battery performance can be prevented, which is preferable.

The average outer diameter and the fiber length of the carbon nanotubes in the dispersion composition are measured as follows. The CNT dispersion composition is diluted with a solvent to a CNT concentration of 0.048 mass %. Then, several microliters of the diluted dispersion composition are spray-coated onto a mica substrate and dried on a hot plate at 100° C. to prepare a substrate for observing the CNT fiber length. The solvent used is the solvent used in preparing the CNT dispersion composition. The measurement may be performed by SEM observation of the mica substrate and performing image analysis. The length of the short axis and the length of the long axis of 300 fibers are measured, and calculation may be performed according to the average values thereof.

The dispersibility of the carbon nanotubes in the dispersion composition may be evaluated by the complex modulus and the phase angle measured by dynamic viscoelasticity measurement. The complex modulus indicates the hardness of the dispersion composition, and tends to decrease as the dispersibility of the carbon nanotubes improves and as the viscosity decreases. However, in the case where the fiber length of the carbon nanotubes is large, even if the carbon nanotubes are in a state uniformly and stably dispersed in the medium, the complex modulus may exhibit a high value due to the structural viscosity of the carbon nanotubes themselves. In an embodiment, the complex modulus of the dispersion composition is preferably 5 Pa or more, and more preferably 10 Pa or more, at 25° C. and 1 Hz. In addition, the complex modulus is preferably less than 300 Pa, and more preferably less than 60 Pa.

By configuring the complex modulus of the dispersion composition within the above range, even for carbon-based conductive materials with large fiber lengths such as carbon nanotubes, it is possible to obtain a dispersion composition of carbon-based conductive materials that are uniformly and well dispersed while maintaining the length to be a specific value or more.

In addition, the phase angle represents a phase shift of the stress wave in the case where the strain applied to the dispersion composition is a sine wave. For a purely elastic body, it becomes a sine wave in phase with the applied strain, and thus a phase angle of 0°. On the other hand, for a purely viscous body, it becomes a stress wave 90° ahead. For general samples for viscoelasticity measurement, it becomes a sine wave with the phase angle being greater than 0° and less than 90°. If dispersibility of the carbon nanotubes in the dispersion composition is good, the phase angle approaches 90°, which is a purely viscous body.

However, similar to the complex modulus, in the case of having structural viscosity of the carbon nanotubes themselves, even if the carbon nanotubes are in a state uniformly and stably dispersed in the medium, the phase angle may exhibit a low value. From such a viewpoint, in an embodiment, the phase angle of the dispersion composition according to dynamic viscoelasticity measurement at 25° C. and 1 Hz is preferably 3° or more, more preferably 5° or more, and even more preferably 10° or more. In addition, the phase angle is preferably less than 60°, and more preferably 50° or less.

By configuring the phase angle of the dispersion composition within the above range, even for carbon-based conductive materials with large fiber lengths such as carbon nanotubes, it is possible to obtain a dispersion composition of carbon-based conductive materials that are uniformly and well dispersed while maintaining the length to be a specific value or more.

By uniformly and well dispersing the carbon nanotubes with large fiber lengths while maintaining the length to be a specific value or more, a developed conductive network is formed. Thus, it is not sufficient for the carbon nanotube dispersion composition to simply have a low viscosity and good (apparent) dispersibility. It is important to determine the dispersion state by combining either or both of the complex modulus and the phase angle with conventional indicators such as viscosity. Among these, it is particularly important to focus on the phase angle. From such a viewpoint, by configuring the complex modulus and the phase angle within the above ranges, a carbon nanotube dispersion composition with good conductivity and electrode strength can be easily obtained. The complex modulus and the phase angle of the carbon nanotube dispersion composition may be measured according to the method described in Examples.

When measured at a shear rate of 1 (s$^{-1}$) using a rheometer, the viscosity of the dispersion composition in the present embodiment is preferably 5 Pa·s or more, more preferably 10 Pa·s or more, and even more preferably 20 Pa·s or more, and is preferably less than 60 Pa·s, and more preferably less than 40 Pa·s. In addition, when measured at a shear rate of 10 (s$^{-1}$) using a rheometer, the viscosity is preferably 1 Pa·s or more, and preferably less than 10 Pas. By configuring the viscosity at each shear rate within the above ranges, the dispersion particle diameter and the dispersion state of the carbon nanotubes can be improved, and electrode strength and conductivity can be improved.

The dispersion composition of the present embodiment may be formed into a mixture slurry by further adding an active material, and may be used for forming an electrode film.

In addition, a film formed using the dispersion composition may be used as an underlayer in an electrode, as it can improve adhesion between an electrode film and a current collector or improve conductivity of the electrode film.

<2> Mixture Slurry

The mixture slurry of the present embodiment may be obtained by adding an active material to the dispersion composition, and may be preferably used for a secondary battery electrode.

Since the dispersion composition of the present embodiment has excellent fluidity and dispersion stability, a mixture slurry with uniformly dispersed carbon nanotubes can be obtained, and conductive paths can be sufficiently maintained in the formed electrode.

The active material may be a positive electrode active material or a negative electrode active material. In this specification, the positive electrode active material and the negative electrode active material may be simply referred to as "active material". The active material is a material that serves as the basis for battery reaction. Active materials are divided into positive electrode active materials and negative electrode active materials based on an electromotive force. By using a positive electrode active material, a positive electrode mixture slurry may be formed, and by using a negative electrode active material, a negative electrode mixture slurry may be formed.

The mixture slurry is preferably in a slurry state to improve uniformity and processability.

In addition, it is also possible to appropriately include, as needed, other optional components for purposes such as binding, wetting, surfactant properties, pH adjustment, wetting promotion, leveling, conductive assistance, etc. within ranges that do not hinder the objective of the present invention. The optional components may be added at any timing, such as before preparing the mixture slurry, during mixing, after mixing, or any combination thereof.

A binder may be added to the dispersion composition to further bind the active material and the like.

As the binder used in production of the mixture slurry, there is no particular limitation as long as it is a polymer component generally used as a binder for a battery, and may be appropriately selected according to the purpose. The above polyvinylidene fluoride resin, which may have substituents, may be used, and examples of other polymer components may include: polymers or copolymers having, as constituent components, ethylene, propylene, vinyl chloride, vinyl acetate, maleic acid, acrylic acid, acrylic acid ester, methacrylic acid, methacrylic acid ester, styrene, etc.; polyurethane resin, polyester resin, phenolic resin, epoxy resin, phenoxy resin, urea resin, melamine resin, alkyd resin, acrylic resin, formaldehyde resin, silicone resin; elastomers such as styrene-butadiene rubber and fluorine rubber; conductive resins such as polyaniline, polyacetylene, etc. In addition, modified products, mixtures, and copolymers of these resins may also be used, and may be used as one type alone or as a combination of two or more types. These resins may also be used as a thickener.

The content of CNT in the mixture slurry is preferably 0.01 parts by mass or more, more preferably 0.03 parts by mass or more, and even more preferably 0.05 parts by mass or more, with respect to 100 parts by mass of the active material. In addition, the content is preferably 10 parts by mass or less, more preferably 5 parts by mass or less, and even more preferably 3 parts by mass or less. If the content is equal to or less than the upper limit value, a decrease in the filling amount of the active material in the electrode can be prevented, and reduction in the capacity of the battery can be suppressed. In addition, if the content is equal to or more than the lower limit value, conductivity of the electrode and the battery becomes sufficient, which is preferable.

The content of the binder in the mixture slurry is preferably 0.01 parts by mass or more, and more preferably 0.02 parts by mass or more, with respect to 100 parts by mass of the active material. By configuring the content to be equal to or more than the lower limit value, adhesion of the conductive film can be further improved. In addition, the content is preferably 20 parts by mass or less, and more preferably 10 parts by mass or less. By configuring the content to be equal to or less than the upper limit value, the concentration of the active material in the conductive film can be increased to achieve higher capacity.

<Positive Electrode Active Material>

The positive electrode active material is not particularly limited, but for secondary battery applications, for example, metal compounds such as metal oxides and metal sulfides capable of reversibly doping or intercalating lithium ions may be used. Examples may include composite oxide powders of lithium and transition metals such as lithium manganese composite oxides (e.g., $Li_xMn_2O_4$ or $Li_xMnO_2$), lithium nickel composite oxides (e.g., $Li_xNiO_2$), lithium cobalt composite oxides ($Li_xCoO_2$), lithium nickel cobalt composite oxides (e.g., $Li_xNi_{1-y}Co_yO_2$), lithium manganese cobalt composite oxides (e.g., $Li_xMn_yCo_{1-y}O_2$), lithium nickel manganese cobalt composite oxides (e.g., $Li_xNi_y$-$Co_zMn_{1-y-z}O_2$), spinel-type lithium manganese nickel composite oxides (e.g., $Li_xMn_{2-y}Ni_yO_4$), etc., lithium phosphate oxide powders having an olivine structure (e.g., $Li_xFePO_4$, $Li_xFe_{1-y}Mn_yPO_4$, $Li_xCoPO_4$, etc.), transition metal oxide powders such as manganese oxide, iron oxide, copper oxide, nickel oxide, vanadium oxides (e.g., V205, V6013), titanium oxide, etc., transition metal sulfide powders such as iron sulfate ($Fe_2(SO_4)_3$), $TiS_2$, and FeS. x, y, and z are numbers, where $0<x<1$, $0<y<1$, $0<z<1$, and $0<y+z<1$. These positive electrode active materials may be used as one type alone or as a combination of multiple types.

<Negative Electrode Active Material>

The negative electrode active material is not particularly limited, but may be, for example, metal Li capable of reversibly doping or intercalating lithium ions, or its alloy, tin alloy, silicon alloy negative electrode, metal oxide-based materials such as $Li_xTiO_2$, $Li_xFe_2O_3$, $Li_xFe_3O_4$, $Li_xWO2$, etc., conductive polymers such as polyacetylene, poly-p-phenylene, etc., artificial graphite such as highly graphitized carbon materials, or carbonaceous powders such as natural graphite, and resin-baked carbon materials. x is a number, where $0<x<1$. These negative electrode active materials may be used alone as one type or as a combination of multiple types. Especially, in the case of using a silicon alloy negative electrode, while a theoretical capacity is large, volume expansion is also extremely large. Thus, it is preferable to use it in combination with artificial graphite such as highly graphitized carbon materials, or carbonaceous powders such as natural graphite, resin-baked carbon materials, etc.

Silicon-based active materials undergo significant volume changes associated with absorption and release of lithium ions, and without ensuring conductive paths by carbon nanotubes adjusted to an appropriate particle size, it would be difficult to perform good repeated charging and discharging. However, since the dispersion composition of the present embodiment is excellent in fluidity and dispersion stability, even in the case of using graphite powder and silicon-based active material as the negative electrode active material, an increase in internal resistance within the electrode can be suppressed, and a decrease in charge-discharge capacity can be suppressed.

<Production Method of Mixture Slurry>

In the method of preparing the mixture slurry, in the case of adding a binder to the dispersion composition, the order of adding the binder and the active material is not particularly limited. Examples may include: a method of adding the binder to the dispersion composition, and next adding the active material; a method of adding the active material to the dispersion composition, and next adding the binder; and a method of adding the binder and the active material together to the dispersion composition. In addition, the binder may be dissolved in advance before addition. The method of preparing the mixture slurry is preferably a method of adding the binder to the dispersion composition, and next further adding the active material and performing a stirring treatment. The stirring apparatus used for stirring is not particularly limited. The stirring apparatus may be a disper, a homogenizer, etc.

The non-volatile content in the mixture slurry is preferably 30 mass % or more, and more preferably 40 mass % or more, based on the mass of the mixture slurry (100 mass %). In addition, it is preferably 90 mass % or less, and more preferably 85 mass % or less.

<3> Electrode Film

The electrode film is obtained by forming the mixture slurry into a film shape, and includes at least carbon nanotubes (A), a dispersant (B), a basic compound (D) as needed, and an active material. The electrode film may further include optional components such as a binder. The electrode film may be obtained, for example, by adding an active material and, as needed, a binder to the carbon nanotube dispersion composition described above to prepare a mixture slurry, and applying or coating the mixture slurry. In addition, for example, the electrode film may be formed by coating the mixture slurry onto a current collector and removing volatile components.

<4> Secondary Battery

The secondary battery of an embodiment of the present invention preferably includes a positive electrode, a negative electrode, and an electrolyte, and at least one selected from the group consisting of the positive electrode and the negative electrode preferably has an electrode film formed from the mixture slurry of the present embodiment. The positive electrode and the negative electrode may further include a current collector. In the case where one of the electrode films of the positive electrode or the negative electrode is an electrode film using the dispersion composition according to the present embodiment, the electrode film of the other electrode is not particularly limited and may be a conventionally known electrode film.

In the present embodiment, the structure of the secondary battery is not particularly limited. The secondary battery may typically include a positive electrode, a negative electrode, and an electrolyte, and may include a separator provided as needed. The secondary battery may be formed in various shapes according to the intended application, such as a paper type, a cylindrical type, a button type, a laminated type, etc.

<Positive Electrode or Negative Electrode>

The positive electrode or the negative electrode has an electrode film formed from the mixture slurry using the dispersion composition of the present embodiment, and a current collector. The electrode film may be formed, for example, by coating the dispersion composition on the current collector and drying. An electrode film formed using a positive electrode mixture slurry may be used as a positive electrode. An electrode film formed using a negative electrode mixture slurry may be used as a negative electrode. In this specification, a film formed using a dispersion composition containing an active material may be referred to as "electrode mixture layer".

The material and the shape of the current collector used for forming the above electrode film are not particularly limited, and may be appropriately selected for various types of secondary batteries. Examples of the material of the current collector may include conductive metals or alloys such as aluminum, copper, nickel, titanium, or stainless steel. In addition, as the shape, although a flat foil is generally used, a current collector with a roughened surface, a perforated foil-shaped current collector, or a mesh-shaped current collector may also be used. The thickness of the current collector is preferably about 0.5 to 30 μm.

There is no particular restriction on the method of coating the dispersion composition on the current collector, and known methods may be used. Specifically, examples may include a die coating method, a dip coating method, a roll coating method, a doctor coating method, a knife coating method, a spray coating method, a gravure coating method, a screen printing method, or an electrostatic coating method. Examples of the drying method may include natural drying, or drying using a forced air dryer, a hot air dryer, an infrared heater, a far-infrared heater, etc., but are not particularly limited thereto.

After coating, a rolling treatment may be performed using a flat press, a calendar roll, etc. The thickness of the formed film is, for example, 1 μm or more and 500 μm or less, and preferably 10 μm or more and 300 μm or less.

<Electrolyte>

As the electrolyte, various conventionally known electrolytes allowing ion movement may be used. Examples may include those containing lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, $LiAlCl$, $LiHF_2$, LiSCN, or $LiBPh_4$ (where Ph is a phenyl group), but are not limited thereto. The electrolyte is preferably dissolved in a non-aqueous solvent and used as an electrolyte solution.

The non-aqueous solvent is not particularly limited, and examples may include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; and nitriles such as acetonitrile. These solvents may be respectively used alone or in a mixture of two or more types.

The secondary battery preferably includes a separator. Examples of the separator may include polyethylene nonwoven fabric, polypropylene nonwoven fabric, polyamide nonwoven fabric, and nonwoven fabrics subjected to a hydrophilic treatment, but are not particularly limited thereto.

The embodiments of the present invention include the following. However, the present invention is not limited to the following embodiments and includes various forms.

[1] A carbon nanotube dispersion composition including carbon nanotubes (A), a dispersant (B), a solvent (C), and a basic compound (D), where a particle diameter $D_{50}$ at a cumulative volume of 50% according to laser diffraction particle size distribution measurement is 0.3 to 7 μm, and (1) and (2) below are satisfied.

(1) The dispersant (B) is a polymer that has a weight average molecular weight of 5,000 or more and 360,000 or less and includes a carboxyl group-containing structural unit, and a content ratio of the carboxyl group-containing structural unit is 80 mass % or more based on a mass of the polymer.

(2) When the particle diameter $D_{50}$ at a cumulative volume of 50% according to laser diffraction particle size distribution measurement of the carbon nanotube dispersion composition is X [µm] and a pH is Y, X and Y satisfy (Formula a) and (Formula b) below.

$$Y \geq -0.149X + 4.545 \quad \text{(Formula a)}$$

$$Y \leq -0.134X + 5.140 \quad \text{(Formula b)}$$

[2] The carbon nanotube dispersion composition according to [1], where a phase angle at 1 Hz at 25° C. according to dynamic viscoelasticity measurement is 3° or more and less than 60°.

[3] The carbon nanotube dispersion composition according to [1] or [2], where a complex modulus at 1 Hz at 25° C. according to dynamic viscoelasticity measurement is 5 Pa or more and less than 300 Pa.

[4] The carbon nanotube dispersion composition according to any one of [1] to [3], where a content of the dispersant (B) is 15 to 90 parts by mass with respect to 100 parts by mass of the carbon nanotubes (A).

[5] The carbon nanotube dispersion composition according to any one of [1] to [4], where the carboxyl group-containing structural unit is a structural unit derived from (meth)acrylic acid.

[6] A mixture slurry including the carbon nanotube dispersion composition according to any one of [1] to [5] and an active material.

[7] An electrode film formed from the mixture slurry according to [6].

[8] A secondary battery including a positive electrode and a negative electrode, where at least one of the positive electrode and the negative electrode has the electrode film according to [7].

The disclosure of the present application is related to the subject matter described in Japanese Patent Application No. 2023-142456 filed on Sep. 1, 2023, the entire disclosed contents of which are incorporated herein by reference.

EXAMPLES

The present invention will be described more specifically below with reference to Examples. The present invention is not limited to the following Examples as long as it does not exceed the gist thereof. Unless otherwise specified, "parts" refers to "parts by mass", and "%" refers to "mass %".

<Average Outer Diameter of Carbon Nanotubes>

Measurement method: carbon nanotubes were dispersed in toluene using an ultrasonic homogenizer, and then the carbon nanotubes placed and dried on a collodion film were observed and imaged using a transmission electron microscope (TEM). Next, 100 carbon nanotubes were randomly selected in the observed image, and their respective outer diameters were measured. Then, an average outer diameter (nm) of the raw material carbon nanotubes was calculated as the number average of the outer diameters.

<Specific Surface Area Measurement of Carbon Nanotubes>

0.03 g of CNT was weighed using an electronic balance (MSA225S100DI manufactured by Sartorius), and then dried at 110° C. for 15 minutes while degassing. Afterward, a BET specific surface area of the CNT was measured using a fully automatic specific surface area measurement apparatus (HM-model1208 manufactured by MOUNTECH).

Details of the materials used in the present Examples and Comparative Examples are as follows:

<Carbon Nanotubes (A)>

TUBALL: Single-wall carbon nanotubes (produced by OCSiAl, average outer diameter 1.6 nm, specific surface area 980 $m^2$/g)

10B: JENOTUBE10B (produced by JEIO, multi-wall CNT, average outer diameter 10 nm, specific surface area 233 $m^2$/g)

6A: JENOTUBE6A (produced by JEIO, multi-wall CNT, average outer diameter 6 nm, specific surface area 680 $m^2$/g)

TNSAR: Single-wall carbon nanotubes (produced by Timesnano, average outer diameter 1.5 nm, specific surface area 950 $m^2$/g)

BT1001M: LUCAN BT1001M (produced by LGC, multi-wall CNT, average outer diameter 10 nm, specific surface area 260 $m^2$/g)

<Basic Compound (D)>

D-1: $Na_2CO_3$ (sodium carbonate, produced by Tokyo Chemical Industry Co., Ltd., purity >99.0%)

D-2: NaOH (sodium hydroxide, produced by Tokyo Chemical Industry Co., Ltd., purity >98.0%, granular)

D-3: KOH (potassium hydroxide, produced by Tokyo Chemical Industry Co., Ltd., purity >86.0%)

D-4: CH3COONa (sodium acetate, produced by Tokyo Chemical Industry Co., Ltd., purity >98.5%)

D-5: $K_2CO_3$ (potassium carbonate, produced by Tokyo Chemical Industry Co., Ltd., purity >99.0%)

D-6: BtONa (sodium t-butoxide, produced by Tokyo Chemical Industry Co., Ltd., purity >98.0%)

<Production of Dispersant (B) and the Like>

(Dispersant (B-1))

To a reaction vessel equipped with a thermometer, a condenser, and a stirrer, 137 parts of ion-exchanged water, 100 parts of acrylic acid, 0.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A 4-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-1)).

(Dispersant (B-2))

To a reaction vessel equipped with a thermometer, a condenser, and a stirrer, 137 parts of ion-exchanged water, 95 parts of acrylic acid, 5 parts of acrylonitrile, 2.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A 4-neck separable flask was loaded with 500 parts of methyl ethyl ketone and 500 parts of methanol, and upon 1,000 rotation using a disper, and the aqueous solution of the polymer was added dropwise over a period of 1 hour. The resulting white precipitate was filtered out and dried under reduced pressure to obtain a polymer (dispersant (B-2)).
(Dispersant (B-3))

To a reaction vessel equipped with a thermometer, a condenser, and a stirrer, 137 parts of ion-exchanged water, 95 parts of acrylic acid, 5 parts of 2-hydroxyethyl acrylate, 0.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A 4-neck separable flask was loaded with 500 parts of methyl ethyl ketone and 500 parts of methanol, and upon 1,000 rotations using a disper, and the aqueous solution of the polymer was added dropwise over a period of 1 hour. The resulting white precipitate was filtered out and dried under reduced pressure to obtain a polymer (dispersant (B-3)).
(Dispersant (B-4))

A reaction vessel equipped with a gas introduction tube, a thermometer, a condenser, and a stirrer was loaded with 100 parts of methanol, 0.1 parts of diethanolamine, and 5 parts of sodium hypophosphite, and was replaced with nitrogen gas. Inside of the reaction vessel was heated to 70° C., and 90 parts of acrylic acid and 10 parts of N-vinyl-2-pyrrolidone were added dropwise over a period of 2 hours. Subsequently, an initiator aqueous solution composed of 2 parts of 2,2'-azobis-2-amidinopropane dihydrochloride (produced by Fujifilm Wako Pure Chemical Corporation: V-50) and 18 parts of ion-exchanged water was added dropwise over a period of 1.5 hours. After completing the dropwise addition, reaction was allowed to occur for 3.5 hours. Then, an aqueous solution composed of 0.1 parts of V-50 and 0.9 parts of ion-exchanged water was added. After an additional 30 minutes, an aqueous solution composed of 0.1 parts of V-50 and 0.9 parts of ion-exchanged water was added again.

After 4.5 hours from start of polymerization, it was confirmed that the conversion rate reached 95%, and 0.5 parts of 10% malonic acid aqueous solution was added as a pH adjusting agent to obtain an aqueous dispersion of the polymer. Subsequently, it was filtered by filtering under reduced pressure and washed with methanol, and the solvent was completely removed by drying under reduced pressure to obtain a polymer (dispersant (B-4)).
(Dispersant (B-5))

To a reaction vessel equipped with a thermometer, a condenser, and a stirrer, 137 parts of ion-exchanged water, 100 parts of methacrylic acid, 0.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-5)).

(Dispersant (B-6))

To a reaction vessel equipped with a thermometer, a condenser, and a stirrer, 137 parts of ion-exchanged water, 90 parts of acrylic acid, 5 parts of acrylonitrile, 5 parts of 2-hydroxyethyl acrylate, 2.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-6)).
(Dispersant (B-7))

To a reaction vessel equipped with a thermometer, a condenser, and a stirrer, 137 parts of ion-exchanged water, 95 parts of acrylic acid, 5 parts of methyl acrylate, 0.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-7)).
(Dispersant (B-8))

To a reaction vessel equipped with a thermometer, a condenser, and a stirrer, 137 parts of ion-exchanged water, 100 parts of acrylic acid, 6.9 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 250 parts of methyl ethyl ketone and 250 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-8)).
(Dispersant (B-9))

To a reaction vessel equipped with a thermometer, a condenser, and a stirrer, 137 parts of ion-exchanged water, 100 parts of acrylic acid, 1.25 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 250 parts of methyl ethyl ketone and 250 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-9)).

(Dispersant (B-10))

To a reaction vessel equipped with a thermometer, a condenser, and a stirrer, 137 parts of ion-exchanged water, 80 parts of acrylic acid, 20 parts of acrylamide, 0.55 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B-10)).

(Dispersant (B'-1))

To a reaction vessel equipped with a thermometer, a condenser, and a stirrer, 137 parts of ion-exchanged water, 70 parts of acrylic acid, 30 parts of acrylonitrile, 2.8 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 500 parts of methyl ethyl ketone and 500 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B'-1)).

(Dispersant (B'-2))

To a reaction vessel equipped with a thermometer, a condenser, and a stirrer, 137 parts of ion-exchanged water, 100 parts of acrylic acid, 9.3 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 250 parts of methyl ethyl ketone and 250 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B'-2)).

(Dispersant (B'-3))

To a reaction vessel equipped with a thermometer, a condenser, and a stirrer, 137 parts of ion-exchanged water, 100 parts of acrylic acid, 0.03 parts of 3-mercapto-1,2-propanediol, and 0.5 parts of V-50 (produced by Fujifilm Wako Pure Chemical Corporation) as a polymerization initiator were added, heated to 70° C., and stirred for 300 minutes (5 hours) at a temperature of 70° C. Cooling was performed when the conversion rate became 90% or more, and the reaction was ended. Subsequently, unreacted raw materials were reduced by heated vacuum distillation to obtain an aqueous solution of the polymer. A four-neck separable flask was loaded with 250 parts of methyl ethyl ketone and 250 parts of methanol, and upon 1,000 rotations using a disper, the aqueous solution of the polymer was added dropwise over a period of 1 hour. The resulting white precipitate was filtered out and dried under reduced pressure to obtain a polymer (dispersant (B'-3)).

The molecular weight of the dispersant (B) was measured using gel permeation chromatography (GPC) equipped with an RI detector and a UV detector (210 nm), specifically as follows.

Apparatus: HLC-8320GPC (manufactured by Tosoh Corporation)

Separation columns: The following were disposed in series sequentially.

TSKgel Guardcolumn PWXL (6.0 mm I.D.×4 cm)

Two columns of TSKgel GMPXL (7.8 mm I.D.×30 cm)

Column temperature: 40° C.

Eluent: 0.2 M phosphate buffer solution (pH 7.0)

Flow rate: 1.0 mL/min

The sample was prepared at a concentration of 0.1 mass % in a mixed solution composed of the above eluent, and 0.1 mL was injected. The molecular weight was determined as a converted value using standard PEO/PEG (Agilent Technologies).

TABLE 1

| | Content ratio of each structural unit in polymer [mass %] | | | | | | | Weight |
| --- | --- | --- | --- | --- | --- | --- | --- | --- |
| | Structural unit 1 (Carboxyl group) | Structural unit 2 (group) | Structural unit 3 (Hydroxyl group) | Structural unit 4 (Heterocycle) | Structural unit 5 (Nitrile group) | Structural unit 6 (Ester group) | Structural unit 7 (Amide) | average molecular weight Mw |
| Dispersant (B-1) | 100 | | | | | | | 69,000 |
| Dispersant (B-2) | 95 | | | | | 5 | | 68,000 |
| Dispersant (B-3) | 95 | | 5 | | | | | 69,000 |
| Dispersant (B-4) | 90 | | | 10 | | | | 69,000 |
| Dispersant (B-5) | | 100 | | | | | | 70,000 |
| Dispersant (B-6) | 90 | | 5 | | | 5 | | 68,000 |

TABLE 1-continued

| | Content ratio of each structural unit in polymer [mass %] | | | | | | | Weight |
| | Structural unit 1 (Carboxyl group) | Structural unit 2 group) | Structural unit 3 (Hydroxyl group) | Structural unit 4 (Heterocycle) | Structural unit 5 (Nitrile group) | Structural unit 6 (Ester group) | Structural unit 7 (Amide) | average molecular weight Mw |
|---|---|---|---|---|---|---|---|---|
| Dispersant (B-7) | 95 | | | | | 5 | | 68,000 |
| Dispersant (B-8) | 100 | | | | | | | 8,000 |
| Dispersant (B-9) | 100 | | | | | | | 50,000 |
| Dispersant (B-10) | 80 | | | | | | 20 | 100,000 |
| Dispersant (B'-1) | 70 | | | | 30 | | | 69,000 |
| Dispersant (B'-2) | 100 | | | | | | | 4,500 |
| Dispersant (B'-3) | 100 | | | | | | | 380,000 |

<Preparation of Dispersion Composition>

Example 1-1

According to the materials and compositions shown in Table 2, the materials were added sequentially, and the CNT dispersion composition was prepared according to the following method.

1960.8 parts of ion-exchanged water, 18 parts of the dispersant (B-1), and 1.2 parts of the basic compound (D) were added to a stainless steel vessel and stirred with a disper until uniform.

Subsequently, 20 parts of CNT (TUBALL) were added while stirring with a disper, a square-hole high-shear screen was attached to a high-shear mixer (L5M-A, manufactured by SILVERSON), and batch-type dispersion was performed at a speed of 8,000 rpm until the entirety became uniform and the dispersion particle size became 250 μm or less as measured by a grind gauge. At this time, the dispersion particle size confirmed by the grind gauge was 180 μm.

Subsequently, the dispersion liquid was supplied from the stainless steel vessel via piping to a high-pressure homogenizer (Starburst Lab HJP-17007, manufactured by Sugino Machine), and a pass-type dispersion treatment was performed until the particle diameter $D_{50}$ became 0.3 to 7 μm. After 50 passes, the particle diameter $D_{50}$ was 1.5 μm.

The dispersion treatment was performed using a single nozzle chamber at a nozzle diameter of 0.20 mm and a pressure of 150 MPa, and a carbon nanotube dispersion composition 1 was obtained, containing 1.0 mass % of TUBALL as the carbon nanotubes (A), 0.90 mass % of the dispersant (B-1) as the dispersant (B), and 0.06 mass % of the basic compound (D-1) ($Na_2CO_3$) as the basic compound (D).

Examples 1-2 to 1-28, 1-31 to 1-33, Comparative Examples 1-1 to 1-5

According to the materials and the compositions shown in Table 2, a pass-type dispersion treatment was performed in the same manner as in Example 1-1 until the particle diameter $D_{50}$ became 0.3 to 7 μm, and each dispersion composition (dispersion compositions 2 to 28, 31 to 33, comparative dispersion compositions 1 to 5) was obtained.

Regarding the dispersion conditions, in the case where the particle diameter $D_{50}$ was 7 μm or more at a time point upon performing 20 passes of the pass-type dispersion treatment, an additional 2 passes of the pass-type dispersion treatment were performed, measurement was performed again, this was repeated until the particle diameter $D_{50}$ became 7 μm or less, and the number of passes was controlled to adjust the particle diameter $D_{50}$ to be 0.3 to 7 μm.

Example 1-29

According to the compositions shown in Table 2, the dispersant (B-1), the basic compound (D-1), and ion-exchanged water were loaded in a glass bottle (M-225, manufactured by Hakuyo Glass Co., Ltd.), and sufficiently mixed and dissolved, or mixed. Then, CNT was added and, with zirconia beads (bead diameter 0.5 mm ¢) as media, dispersed for a total of 8 hours using a paint conditioner while cooling the glass bottle every 2 hours, to obtain a carbon nanotube dispersion composition 29. The particle diameter $D_{50}$ was 3.8 μm.

Example 1-30

According to the compositions shown in Table 2, the dispersant (B-1), the conductive material, and a small amount of ion-exchanged water were loaded in a Labo Plastomill (manufactured by Toyo Seiki Seisaku-sho, Ltd.) and dispersed for 3 hours. Then, the mixture was transferred to a stainless steel container, and the remaining ion-exchanged water and basic compound (D-1) were added. A square-hole high-shear screen was attached to a high-shear mixer (L5M-A, manufactured by SILVERSON), and batch-type dispersion was performed at a speed of 8,000 rpm until the entirety became uniform and the dispersion particle size measured by a grind gauge became 250 μm or less, to obtain a carbon nanotube dispersion composition 30. At this time, the dispersion particle size confirmed by the grind gauge was 80 μm, and the particle diameter $D_{50}$ was 6.0 μm.

Examples 1-34 to 1-36

According to the compositions shown in Table 2, carbon nanotube dispersion compositions 34 to 36 were obtained according to the same method as in Example 1-1.

<Measurement and Evaluation of Physical Properties of Dispersion Compositions>

Physical property measurement of the dispersion compositions and evaluation of storage stability were performed according to the following methods. The results are shown in Table 2.

(Method of Measuring Particle Diameter $D_{50}$ of Dispersion Compositions)

The particle diameter $D_{50}$ at a cumulative volume of 50% was measured using a laser diffraction particle size distribution analyzer (Partical LA-960V2, manufactured by HORIBA).

The circulation/ultrasonic operating conditions were set as follows: circulation speed: 3, ultrasonic intensity: 7, ultrasonic time: 1 minute, stirring speed: 1, stirring mode: continuous. In addition, during degassing, ultrasonic operation was performed with an ultrasonic intensity of 7 and an ultrasonic time of 5 seconds. The particle refractive index of the carbon-based conductive material was set to 1.9, and the shape was set to non-spherical. The refractive index of the solvent was set to 1.333. During measurement, the concentration of the CNT dispersion composition was diluted such that the value of the transmittance was in the range of 50 to 85%. The particle size criterion was set to volume.

(Method of Measuring pH of Dispersion Compositions)

The sample for pH measurement was measured using a benchtop PH meter (SevenCompact S200 Expert Pro, manufactured by Mettler Toledo) at a temperature of 25° C.

(Complex Modulus and Phase Angle of Dispersion Compositions)

The complex modulus and the phase angle of the dispersion compositions were determined by performing dynamic viscoelasticity measurement using a rheometer (RheoStress 1 rotational rheometer manufactured by Thermo Fisher Scientific Inc.) with a 35 mm diameter, 2° cone at 25° C. and a frequency of 1 Hz, in the strain rate range of 0.01% to 5%.

The complex modulus is preferably 5 Pa or more and less than 300 Pa, and more preferably 10 Pa or more or less than 60 Pa.

The phase angle is preferably 3° or more and less than 60°, and more preferably 10° or more.

The lower the complex modulus of the dispersion composition is, and the closer the phase angle of the dispersion composition is to 90°, the better the fluidity.

Evaluation criteria for complex modulus
1:300 Pa or more or less than 5 Pa
2:60 Pa or more and less than 300 Pa
3:10 Pa or more and less than 60 Pa
4:5 Pa or more and less than 10 Pa Evaluation criteria for phase angle
1:10° or more and less than 60°
2:3° or more and less than 10°
3: Less than 3°

(Method of Evaluating Storage Stability of Dispersion Compositions)

Evaluation of storage stability was performed by determining presence/absence of fluidity after leaving standing and storing the dispersion composition at 40° C. The determination method was as follows. The complex modulus was evaluated by performing dynamic viscoelasticity measurement using a rheometer (RheoStress 1 rotational rheometer manufactured by Thermo Fisher Scientific Inc.) with a 35 mm diameter, 2° cone at 25° C. and a frequency of 1 Hz, in the strain rate range of 0.01% to 5%. With evaluation criteria ◎ to Δ, practical use is possible.

Evaluation Criteria
◎: Less than 300 Pa even after 1 month (excellent)
○: Reaching 300 Pa after 1 month (good)
Δ: Reaching 300 Pa after 1 week (acceptable)
x: Reaching 300 Pa after 1 day

TABLE 2-1

| | | CNT (A) | | Dispersant (B), etc. | |
|---|---|---|---|---|---|
| | Dispersion composition | Type | Content ratio (%) | Type | Content ratio (%) |
| Example 1-1 | Dispersion composition 1 | TUBALL | 1.0 | B-1 | 0.90 |
| Example 1-2 | Dispersion composition 2 | TUBALL | 1.0 | B-1 | 0.90 |
| Example 1-3 | Dispersion composition 3 | TUBALL | 1.0 | B-1 | 0.90 |
| Example 1-4 | Dispersion composition 4 | TUBALL | 1.0 | B-1 | 0.90 |
| Example 1-5 | Dispersion composition 5 | TUBALL | 1.0 | B-1 | 0.90 |
| Example 1-6 | Dispersion composition 6 | TUBALL | 1.0 | B-1 | 0.90 |
| Example 1-7 | Dispersion composition 7 | TUBALL | 1.0 | B-1 | 0.90 |
| Example 1-8 | Dispersion composition 8 | 10B | 2.5 | B-1 | 1.00 |
| Example 1-9 | Dispersion composition 9 | 10B | 2.5 | B-1 | 1.00 |
| Example 1-10 | Dispersion composition 10 | 10B | 2.5 | B-1 | 1.00 |
| Example 1-11 | Dispersion composition 11 | 10B | 2.5 | B-1 | 1.00 |
| Example 1-12 | Dispersion composition 12 | 6A | 1.2 | B-1 | 0.75 |
| Example 1-13 | Dispersion composition 13 | 6A | 1.2 | B-1 | 0.75 |
| Example 1-14 | Dispersion composition 14 | 6A | 1.2 | B-1 | 0.75 |
| Example 1-15 | Dispersion composition 15 | 6A | 1.2 | B-1 | 0.75 |
| Example 1-16 | Dispersion composition 16 | TNSAR | 1.0 | B-1 | 0.90 |
| Example 1-17 | Dispersion composition 17 | BT1001M | 2.5 | B-1 | 1.00 |
| Example 1-18 | Dispersion composition 18 | TUBALL | 1.0 | B-2 | 0.90 |
| Example 1-19 | Dispersion composition 19 | TUBALL | 1.0 | B-3 | 0.90 |
| Example 1-20 | Dispersion composition 20 | TUBALL | 1.0 | B-4 | 0.90 |

| | Basic compound (D) | | Water | Dispersant amount/CNT | Basic compound amount/ |
|---|---|---|---|---|---|
| | Type | Content ratio (%) | Content ratio (%) | 100 parts by mass | dispersant 100 parts by mass |
| Example 1-1 | D-1 | 0.06 | 98.04 | 90 | 7 |
| Example 1-2 | D-1 | 0.12 | 97.98 | 90 | 13 |
| Example 1-3 | D-1 | 0.06 | 98.04 | 90 | 7 |

TABLE 2-1-continued

| | | | | | |
|---|---|---|---|---|---|
| Example 1-4 | D-1 | 0.12 | 97.98 | 90 | 13 |
| Example 1-5 | D-1 | 0.16 | 97.94 | 90 | 18 |
| Example 1-6 | D-1 | 0.11 | 97.99 | 90 | 12 |
| Example 1-7 | D-1 | 0.18 | 97.92 | 90 | 20 |
| Example 1-8 | D-1 | 0.07 | 96.43 | 40 | 7 |
| Example 1-9 | D-1 | 0.13 | 96.37 | 40 | 13 |
| Example 1-10 | D-1 | 0.13 | 96.37 | 40 | 13 |
| Example 1-11 | D-1 | 0.21 | 96.29 | 40 | 21 |
| Example 1-12 | D-1 | 0.04 | 98.01 | 63 | 5 |
| Example 1-13 | D-1 | 0.11 | 97.94 | 63 | 15 |
| Example 1-14 | D-1 | 0.05 | 98.00 | 63 | 7 |
| Example 1-15 | D-1 | 0.12 | 97.93 | 63 | 16 |
| Example 1-16 | D-1 | 0.12 | 97.98 | 90 | 13 |
| Example 1-17 | D-1 | 0.12 | 96.38 | 40 | 12 |
| Example 1-18 | D-1 | 0.11 | 97.99 | 90 | 12 |
| Example 1-19 | D-1 | 0.11 | 97.99 | 90 | 12 |
| Example 1-20 | D-1 | 0.11 | 97.99 | 90 | 12 |

| | | CNT (A) | | Dispersant (B), etc. | |
|---|---|---|---|---|---|
| | Dispersion composition | Type | Content ratio (%) | Type | Content ratio (%) |
| Example 1-21 | Dispersion composition 21 | TUBALL | 1.0 | B-5 | 0.90 |
| Example 1-22 | Dispersion composition 22 | TUBALL | 1.0 | B-6 | 0.90 |
| Example 1-23 | Dispersion composition 23 | TUBALL | 1.0 | B-7 | 0.90 |
| Example 1-24 | Dispersion composition 24 | TUBALL | 1.0 | B-1 | 0.90 |
| Example 1-25 | Dispersion composition 25 | TUBALL | 1.0 | B-1 | 0.90 |
| Example 1-26 | Dispersion composition 26 | TUBALL | 1.0 | B-1 | 0.90 |
| Example 1-27 | Dispersion composition 27 | TUBALL | 1.0 | B-1 | 0.90 |
| Example 1-28 | Dispersion composition 28 | TUBALL | 1.0 | B-1 | 0.90 |
| Example 1-29 | Dispersion composition 29 | TUBALL | 1.0 | B-1 | 0.90 |
| Example 1-30 | Dispersion composition 30 | TUBALL | 1.0 | B-1 | 0.90 |
| Example 1-31 | Dispersion composition 31 | TUBALL | 1.0 | B-1 | 0.90 |
| Example 1-32 | Dispersion composition 32 | TUBALL | 1.0 | B-1 | 0.90 |
| Example 1-33 | Dispersion composition 33 | TUBALL | 1.0 | B-1 | 0.90 |
| Example 1-34 | Dispersion composition 34 | TUBALL | 1.0 | B-8 | 0.90 |
| Example 1-35 | Dispersion composition 35 | TUBALL | 1.0 | B-9 | 0.90 |
| Example 1-36 | Dispersion composition 36 | TUBALL | 1.0 | B-10 | 0.90 |
| Comparative Example 1-1 | Comparative dispersion composition 1 | TUBALL | 1.0 | B-1 | 0.90 |
| Comparative Example 1-2 | Comparative dispersion composition 2 | TUBALL | 1.0 | B-1 | 0.90 |
| Comparative Example 1-3 | Comparative dispersion composition 3 | TUBALL | 1.0 | B'-1 | 0.90 |
| Comparative Example 1-4 | Comparative dispersion composition 4 | TUBALL | 1.0 | B'-2 | 0.90 |
| Comparative Example 1-5 | Comparative dispersion composition 5 | TUBALL | 1.0 | B'-3 | 0.90 |

| | Basic compound (D) | | Water | Dispersant amount/CNT | Basic compound amount/ |
|---|---|---|---|---|---|
| | Type | Content ratio (%) | Content ratio (%) | 100 parts by mass | dispersant 100 parts by mass |
| Example 1-21 | D-1 | 0.12 | 97.98 | 90 | 13 |
| Example 1-22 | D-1 | 0.10 | 98.00 | 90 | 11 |
| Example 1-23 | D-1 | 0.07 | 98.03 | 90 | 8 |
| Example 1-24 | D-2 | 0.08 | 98.02 | 90 | 9 |
| Example 1-25 | D-3 | 0.08 | 98.02 | 90 | 9 |
| Example 1-26 | D-4 | 0.35 | 97.75 | 90 | 39 |
| Example 1-27 | D-5 | 0.13 | 97.97 | 90 | 14 |
| Example 1-28 | D-6 | 0.28 | 97.82 | 90 | 31 |
| Example 1-29 | D-1 | 0.05 | 98.05 | 90 | 6 |
| Example 1-30 | D-1 | 0.04 | 98.06 | 90 | 4 |
| Example 1-31 | D-1 | 0.05 | 98.05 | 90 | 6 |
| Example 1-32 | D-1 | 0.04 | 98.06 | 90 | 4 |
| Example 1-33 | D-2 | 0.03 | 98.07 | 90 | 3 |
| Example 1-34 | D-1 | 0.11 | 97.99 | 90 | 12 |
| Example 1-35 | D-1 | 0.11 | 97.99 | 90 | 12 |
| Example 1-36 | D-1 | 0.11 | 97.99 | 90 | 12 |
| Comparative Example 1-1 | — | — | 98.10 | 90 | — |
| Comparative Example 1-2 | D-1 | 0.24 | 98.07 | 90 | 3 |
| Comparative Example 1-3 | D-1 | 0.04 | 98.10 | 90 | 4 |
| Comparative Example 1-4 | D-1 | 0.06 | 98.10 | 90 | 7 |

TABLE 2-1-continued

| | | | | | |
|---|---|---|---|---|---|
| Comparative Example 1-5 | D-1 | 0.06 | 98.10 | 90 | 7 |

TABLE 2-2

| | Particle diameter $D_{50}$ X | pH Y | Value of −0.149X + 4.545 | Value of −0.134X + 5.140 | Complex modulus Evaluation | Phase angle Evaluation | Storage stability |
|---|---|---|---|---|---|---|---|
| Example 1-1 | 1.5 | 4.4 | 4.32 | 4.94 | 2 | 1 | ○ |
| Example 1-2 | 1.6 | 4.7 | 4.31 | 4.93 | 2 | 1 | ○ |
| Example 1-3 | 0.8 | 4.5 | 4.43 | 5.03 | 3 | 1 | ○ |
| Example 1-4 | 0.8 | 4.7 | 4.43 | 5.03 | 3 | 1 | ○ |
| Example 1-5 | 0.8 | 4.9 | 4.43 | 5.03 | 3 | 1 | ○ |
| Example 1-6 | 0.5 | 4.6 | 4.47 | 5.07 | 3 | 1 | ○ |
| Example 1-7 | 0.5 | 5.0 | 4.47 | 5.07 | 3 | 1 | ○ |
| Example 1-8 | 1.2 | 4.4 | 4.37 | 4.98 | 3 | 1 | ◎ |
| Example 1-9 | 1.2 | 4.7 | 4.37 | 4.98 | 3 | 1 | ◎ |
| Example 1-10 | 0.4 | 4.7 | 4.49 | 5.09 | 3 | 1 | ◎ |
| Example 1-11 | 0.4 | 5.0 | 4.49 | 5.09 | 3 | 1 | ◎ |
| Example 1-12 | 1.3 | 4.4 | 4.35 | 4.97 | 3 | 1 | ○ |
| Example 1-13 | 1.3 | 4.8 | 4.35 | 4.97 | 3 | 1 | ○ |
| Example 1-14 | 0.7 | 4.5 | 4.44 | 5.05 | 3 | 1 | ○ |
| Example 1-15 | 0.7 | 4.9 | 4.44 | 5.05 | 3 | 1 | ○ |
| Example 1-16 | 0.8 | 4.7 | 4.43 | 5.03 | 2 | 1 | ○ |
| Example 1-17 | 0.9 | 4.6 | 4.41 | 5.02 | 3 | 1 | ◎ |
| Example 1-18 | 0.8 | 4.7 | 4.43 | 5.03 | 3 | 1 | ○ |
| Example 1-19 | 0.8 | 4.7 | 4.43 | 5.03 | 3 | 1 | ○ |
| Example 1-20 | 0.8 | 4.7 | 4.43 | 5.03 | 3 | 1 | ○ |

| | Particle diameter $D_{50}$ X | pH Y | Value of −0.149X + 4.545 | Value of −0.134X + 5.140 | Complex modulus Evaluation | Phase angle Evaluation | Storage stability |
|---|---|---|---|---|---|---|---|
| Example 1-21 | 0.8 | 4.7 | 4.43 | 5.03 | 3 | 1 | ○ |
| Example 1-22 | 0.9 | 4.8 | 4.41 | 5.02 | 3 | 1 | ○ |
| Example 1-23 | 0.9 | 4.7 | 4.41 | 5.02 | 2 | 2 | ○ |
| Example 1-24 | 0.8 | 4.7 | 4.43 | 5.03 | 3 | 1 | ○ |
| Example 1-25 | 0.8 | 4.7 | 4.43 | 5.03 | 3 | 1 | ○ |
| Example 1-26 | 0.8 | 4.7 | 4.43 | 5.03 | 2 | 1 | ○ |
| Example 1-27 | 0.8 | 4.7 | 4.43 | 5.03 | 3 | 1 | ○ |
| Example 1-28 | 0.8 | 4.7 | 4.43 | 5.03 | 2 | 1 | ○ |
| Example 1-29 | 3.8 | 4.3 | 3.98 | 4.63 | 2 | 2 | ○ |
| Example 1-30 | 6.0 | 3.8 | 3.65 | 4.33 | 3 | 1 | ◎ |
| Example 1-31 | 4.1 | 4.1 | 3.93 | 4.59 | 3 | 1 | ◎ |
| Example 1-32 | 5.5 | 4.0 | 3.72 | 4.40 | 3 | 1 | ◎ |
| Example 1-33 | 5.8 | 3.9 | 3.68 | 4.36 | 3 | 1 | ◎ |
| Example 1-34 | 0.4 | 4.5 | 4.49 | 5.19 | 2 | 2 | ○ |
| Example 1-35 | 1.7 | 4.6 | 4.29 | 5.37 | 3 | 1 | ◎ |
| Example 1-36 | 1.8 | 5.2 | 4.28 | 5.38 | 2 | 1 | ○ |
| Comparative Example 1-1 | 1.3 | 3.1 | 4.35 | 4.97 | 1 | 3 | X |
| Comparative Example 1-2 | 1.4 | 8.8 | 4.34 | 4.95 | 1 | 3 | X |
| Comparative Example 1-3 | 1.8 | 4.4 | 4.28 | 4.90 | 1 | 3 | X |
| Comparative Example 1-4 | 4.5 | 4.3 | 3.87 | 4.54 | 1 | 3 | X |
| Comparative Example 1-5 | 4.2 | 4.4 | 3.92 | 4.58 | 1 | 3 | X |

<Preparation and Evaluation of Secondary Battery>
<Preparation of Negative Electrode Mixture Slurry and Negative Electrode>

Example 2-1

A dispersion composition (dispersion composition 1), a thickener, and water were added to a plastic container, and then stirred for 30 seconds at 2,000 rpm using a rotation-revolution mixer (THINKY MIXER manufactured by Thinky Corporation, ARE-310). Subsequently, artificial graphite and silicon (artificial graphite: silicon=9:1 (mass ratio)) were added as negative electrode active materials, and stirred for 150 seconds at 2,000 rpm using the rotation-revolution mixer. Furthermore, thereafter, SBR (styrene-butadiene rubber) was added and stirred for 30 seconds at 2,000 rpm using the rotation-revolution mixer to obtain a negative electrode mixture slurry.

The active materials, the CNT, the dispersant, the thickener, and the SBR in the negative electrode mixture slurry were blended to the blending amounts (mass %) in Table 3 when the total thereof was 100 mass %, and the amount of water was adjusted such that the non-volatile content of the negative electrode mixture slurry became 45%. The blending amount in Table 3 represents the net content ratio (non-volatile content mass %) of each component in the negative electrode mixture slurry.

The obtained negative electrode mixture slurry was coated on a 20 μm thick copper foil using an applicator, and then the coated film was dried in an electric oven at 120° C.±5° C. for 25 minutes to prepare an electrode film. Subsequently, the electrode film was subjected to a rolling treatment using a roll press (3t hydraulic roll press manufactured by THANK METAL) to obtain a negative electrode (negative electrode 1). The basis weight per unit area of the mixture layer was 10 mg/cm², and the density of the mixture layer after the rolling treatment was 1.6 g/cm³.

The raw materials mentioned above are as follows.

Artificial graphite: CGB-20 (produced by Nippon Graphite Industries, Ltd.), non-volatile content 100%

Silicon: Silicon monoxide (produced by Osaka Titanium Technologies Co., Ltd., SILICON MONOOXIDE SiO 1.3C 5 μm, non-volatile content 100%)

Thickener: CMC (carboxymethyl cellulose, #1190 (produced by Daicel FineChem Ltd.), non-volatile content 100%)

Binder: SBR (styrene-butadiene rubber, TRD2001 (produced by JSR Corporation), non-volatile content 48%)

Examples 2-2 to 2-36

The dispersion composition was changed to each dispersion composition (dispersion compositions 2 to 36) shown in Table 3, and the composition ratio was changed as shown in Table 3. Except for the above, negative electrode mixture slurries were produced in the same manner as in Example 2-1, and negative electrodes 2 to 36 were obtained in the same manner.

Comparative Examples 2-1 to 2-5

The dispersion composition was changed to each dispersion composition (comparative dispersion compositions 1 to 5) shown in Table 3. Except for the above, comparative negative electrode mixture slurries were produced in the same manner as in Example 2-1, and comparative negative electrodes 1 to 5 were obtained in the same manner.

Reference Example 2-1: Preparation of Standard Negative Electrode

To a plastic container of a capacity 150 ml, 0.5 mass % of acetylene black (DENKA BLACK (registered trademark) HS-100, produced by Denka Company Limited), 1 mass % of MAC500LC (carboxymethyl cellulose sodium salt, Sunrose special type MAC500LC, produced by Nippon Paper Industries Co., Ltd., non-volatile content 100%), and 98.4 mass % of water were added, and then stirred for 30 seconds at 2,000 rpm using a rotation-revolution mixer (THINKY MIXER manufactured by Thinky Corporation, ARE-310). Furthermore, 97 mass % of artificial graphite (CGB-20, produced by Nippon Graphite Industries, Ltd.) was added as an active material, and stirred for 150 seconds at 2,000 rpm using the rotation-revolution mixer (THINKY MIXER manufactured by Thinky Corporation, ARE-310). Subsequently, 3.1 mass % of SBR (styrene-butadiene rubber, TRD2001, non-volatile content 48%, produced by JSR Corporation) was added, and stirred for 30 seconds at 2,000 rpm using the rotation-revolution mixer (THINKY MIXER manufactured by Thinky Corporation, ARE-310) to obtain a standard negative electrode mixture slurry. The non-volatile content of the standard negative electrode mixture slurry was 50 mass %.

The above standard negative electrode mixture slurry was coated onto a 20 μm thick copper foil serving as a current collector using an applicator, and then dried in an electric oven at 80° C.±5° C. for 25 minutes to adjust the basis weight per unit area of the electrode to 10 mg/cm². Furthermore, a rolling treatment was performed using a roll press (3t hydraulic roll press manufactured by THANK METAL) to prepare a standard negative electrode with a density of the electrode mixture layer being 1.6 g/cm³.

TABLE 3

| | | Dispersion composition | | | | Active material | Thickener CMC | Binder SBR |
|---|---|---|---|---|---|---|---|---|
| | | | | CNT (A) | Dispersant | | | |
| | Negative electrode | | | Type | Non-volatile content mass % | Non-volatile content mass % | Non-volatile content mass % | Non-volatile content mass % | Non-volatile content mass % |
| Example 2-1 | Negative electrode 1 | Dispersion composition 1 | | TUBALL | 0.10 | 0.09 | 97.3 | 1.0 | 1.5 |
| Example 2-2 | Negative electrode 2 | Dispersion composition 2 | | TUBALL | 0.10 | 0.09 | 97.3 | 1.0 | 1.5 |
| Example 2-3 | Negative electrode 3 | Dispersion composition 3 | | TUBALL | 0.10 | 0.09 | 97.3 | 1.0 | 1.5 |
| Example 2-4 | Negative electrode 4 | Dispersion composition 4 | | TUBALL | 0.10 | 0.09 | 97.3 | 1.0 | 1.5 |
| Example 2-5 | Negative electrode 5 | Dispersion composition 5 | | TUBALL | 0.10 | 0.09 | 97.3 | 1.0 | 1.5 |
| Example 2-6 | Negative electrode 6 | Dispersion composition 6 | | TUBALL | 0.10 | 0.09 | 97.3 | 1.0 | 1.5 |
| Example 2-7 | Negative electrode 7 | Dispersion composition 7 | | TUBALL | 0.10 | 0.09 | 97.3 | 1.0 | 1.5 |
| Example 2-8 | Negative electrode 8 | Dispersion composition 8 | | JENOTUBE10B | 0.50 | 0.20 | 96.8 | 1.0 | 1.5 |
| Example 2-9 | Negative electrode 9 | Dispersion composition 9 | | JENOTUBE10B | 0.50 | 0.20 | 96.8 | 1.0 | 1.5 |
| Example 2-10 | Negative electrode 10 | Dispersion composition 10 | | JENOTUBE10B | 0.50 | 0.20 | 96.8 | 1.0 | 1.5 |
| Example 2-11 | Negative electrode 11 | Dispersion composition 11 | | JENOTUBE10B | 0.50 | 0.20 | 96.8 | 1.0 | 1.5 |
| Example 2-12 | Negative electrode 12 | Dispersion composition 12 | | JENOTUBE6A | 0.30 | 0.19 | 97.0 | 1.0 | 1.5 |
| Example 2-13 | Negative electrode 13 | Dispersion composition 13 | | JENOTUBE6A | 0.30 | 0.19 | 97.0 | 1.0 | 1.5 |
| Example 2-14 | Negative electrode 14 | Dispersion composition 14 | | JENOTUBE6A | 0.30 | 0.19 | 97.0 | 1.0 | 1.5 |
| Example 2-15 | Negative electrode 15 | Dispersion composition 15 | | JENOTUBE6A | 0.30 | 0.19 | 97.0 | 1.0 | 1.5 |
| Example 2-16 | Negative electrode 16 | Dispersion composition 16 | | TNSAR | 0.10 | 0.09 | 97.3 | 1.0 | 1.5 |
| Example 2-17 | Negative electrode 17 | Dispersion composition 17 | | BT1001M | 0.50 | 0.20 | 96.8 | 1.0 | 1.5 |
| Example 2-18 | Negative electrode 18 | Dispersion composition 18 | | TUBALL | 0.10 | 0.09 | 97.3 | 1.0 | 1.5 |
| Example 2-19 | Negative electrode 19 | Dispersion composition 19 | | TUBALL | 0.10 | 0.09 | 97.3 | 1.0 | 1.5 |
| Example 2-20 | Negative electrode 20 | Dispersion composition 20 | | TUBALL | 0.10 | 0.09 | 97.3 | 1.0 | 1.5 |
| Example 2-21 | Negative electrode 21 | Dispersion composition 21 | | TUBALL | 0.10 | 0.09 | 97.3 | 1.0 | 1.5 |
| Example 2-22 | Negative electrode 22 | Dispersion composition 22 | | TUBALL | 0.10 | 0.09 | 97.3 | 1.0 | 1.5 |

TABLE 3-continued

| | | Dispersion composition | | | Active material | Thickener CMC | Binder SBR |
| | | | CNT (A) | Dispersant | | | |
| | Negative electrode | | Type | Non-volatile content mass % | Non-volatile content mass % | Non-volatile content mass % | Non-volatile content mass % | Non-volatile content mass % |
|---|---|---|---|---|---|---|---|---|
| Example 2-23 | Negative electrode 23 | Dispersion composition 23 | TUBALL | 0.10 | 0.09 | 97.3 | 1.0 | 1.5 |
| Example 2-24 | Negative electrode 24 | Dispersion composition 24 | TUBALL | 0.10 | 0.09 | 97.3 | 1.0 | 1.5 |
| Example 2-25 | Negative electrode 25 | Dispersion composition 25 | TUBALL | 0.1 | 0.09 | 97.3 | 1.0 | 1.5 |
| Example 2-26 | Negative electrode 26 | Dispersion composition 26 | TUBALL | 0.10 | 0.09 | 97.3 | 1.0 | 1.5 |
| Example 2-27 | Negative electrode 27 | Dispersion composition 27 | TUBALL | 0.10 | 0.09 | 97.3 | 1.0 | 1.5 |
| Example 2-28 | Negative electrode 28 | Dispersion composition 28 | TUBALL | 0.10 | 0.09 | 97.3 | 1.0 | 1.5 |
| Example 2-29 | Negative electrode 29 | Dispersion composition 29 | TUBALL | 0.10 | 0.09 | 97.3 | 1.0 | 1.5 |
| Example 2-30 | Negative electrode 30 | Dispersion composition 30 | TUBALL | 0.10 | 0.09 | 97.3 | 1.0 | 1.5 |
| Example 2-31 | Negative electrode 31 | Dispersion composition 31 | TUBALL | 0.10 | 0.09 | 97.3 | 1.0 | 1.5 |
| Example 2-32 | Negative electrode 32 | Dispersion composition 32 | TUBALL | 0.10 | 0.09 | 97.3 | 1.0 | 1.5 |
| Example 2-33 | Negative electrode 33 | Dispersion composition 33 | TUBALL | 0.10 | 0.09 | 97.3 | 1.0 | 1.5 |
| Example 2-34 | Negative electrode 34 | Dispersion composition 34 | TUBALL | 0.10 | 0.09 | 97.3 | 1.0 | 1.5 |
| Example 2-35 | Negative electrode 35 | Dispersion composition 35 | TUBALL | 0.10 | 0.09 | 97.3 | 1.0 | 1.5 |
| Example 2-36 | Negative electrode 36 | Dispersion composition 36 | TUBALL | 0.10 | 0.09 | 97.3 | 1.0 | 1.5 |
| Comparative Example 2-1 | Comparative negative electrode 1 | Comparative dispersion composition 1 | TUBALL | 0.10 | 0.09 | 97.3 | 1.0 | 1.5 |
| Comparative Example 2-2 | Comparative negative electrode 2 | Comparative dispersion composition 2 | TUBALL | 0.10 | 0.09 | 97.3 | 1.0 | 1.5 |
| Comparative Example 2-3 | Comparative negative electrode 3 | Comparative dispersion composition 3 | TUBALL | 0.10 | 0.09 | 97.3 | 1.0 | 1.5 |
| Comparative Example 2-4 | Comparative negative electrode 4 | Comparative dispersion composition 4 | TUBALL | 0.10 | 0.09 | 97.3 | 1.0 | 1.5 |
| Comparative Example 2-5 | Comparative negative electrode 5 | Comparative dispersion composition 5 | TUBALL | 0.10 | 0.09 | 97.3 | 1.0 | 1.5 |

<Preparation of Positive Electrode Mixture Slurry and Positive Electrode>

Example 3-1

A dispersion composition (dispersion composition 1), a thickener, and water were added to a plastic container, and then stirred for 30 seconds at 2,000 rpm using a rotation-revolution mixer (THINKY MIXER manufactured by Thinky Corporation, ARE-310). Subsequently, LFP was added as a positive electrode active material and stirred for 150 seconds at 2,000 rpm using the rotation-revolution mixer (THINK Y MIXER manufactured by Thinky Corporation, ARE-310). Furthermore, thereafter, PTFE was added as a binder, and stirred for 30 seconds at 2,000 rpm using the rotation-revolution mixer (THINK Y MIXER manufactured by Thinky Corporation, ARE-310) to obtain a positive electrode mixture slurry.

The active material, the CNT, the dispersant, the thickener, and the binder (PTFE) in the positive electrode mixture slurry were blended to the blending amounts (mass %) shown in Table 4 when the total of the non-volatile contents thereof were 100 mass %, and the amount of water was adjusted such that the non-volatile contents of the positive electrode mixture slurry became 65%. The blending amount in Table 4 represents the net content ratio (non-volatile content mass %) of each component in the positive electrode mixture slurry.

The positive electrode mixture slurry was coated onto a 20 µm thick aluminum foil using an applicator, and then dried in an electric oven at 120° C.±5° C. for 25 minutes to prepare an electrode film. Subsequently, the electrode film was subjected to a rolling treatment using a roll press (3t hydraulic roll press manufactured by THANK METAL) to obtain a positive electrode (positive electrode 1). The basis weight per unit area of the mixture layer was 20 mg/cm², and the density of the mixture layer after the rolling treatment was 2.1 g/cc.

The raw materials mentioned above are as follows.

LFP: Lithium iron phosphate HED (registered trademark) LFP-400 (produced by BASF, non-volatile content 100%)

Binder: PTFE (polytetrafluoroethylene, Polyflon PTFE D-210C (produced by Daikin Industries, Ltd., non-volatile content 60%)

Thickener: CMC (carboxymethyl cellulose #1190 (produced by Daicel FineChem Ltd., non-volatile content 100%)

Examples 3-2 to 3-36

The conductive material dispersion was changed to each dispersion composition (dispersion compositions 2 to 36) shown in Table 4. Except for the above, positive electrodes 2 to 36 were obtained by the same method as in Example 3-1.

Comparative Examples 3-1 to 3-5

The conductive material dispersion was changed to each dispersion composition (comparative dispersion compositions 1 to 5) shown in Table 4. Except for the above, comparative positive electrodes 1 to 5 were obtained by the same method as in Example 3-1.

Reference Example 3-1: Preparation of Standard Positive Electrode 92 mass % of LFP (HED (registered trademark) LFP-400, produced by BASF, non-volatile content 100%) as a positive electrode active material, 4 mass % of acetylene black (DENKA BLACK (registered trademark) HS-100, produced by Denka Company Limited, non-volatile content 100%), and 1.6 mass % of a thickener (carboxymethyl cellulose #1190, produced by Daicel FineChem Ltd., non-volatile content 100%) were added to a plastic container and then mixed using a spatula until uniform. Subsequently, 20.5 mass % of water was added, and stirred for 30 seconds at 2,000 rpm using a rotation-revolution mixer (THINKY MIXER manufactured by Thinky Corporation, ARE-310). Then, the mixture in the plastic container was mixed with a spatula until uniform, and 4 mass % of PTFE (produced by Daikin Industries, Ltd., non-volatile content 60 mass %) was added and stirred for 30 seconds at 2,000 rpm using the rotation-revolution mixer. Furthermore, thereafter, 11.2 mass % of water was added and stirred for 30 seconds at 2,000 rpm using the rotation-revolution mixer. Finally, the mixture was stirred for 10 minutes at 3,000 rpm using a high-speed stirrer to obtain a standard positive electrode mixture slurry.

The standard positive electrode mixture slurry was coated onto a 20 μm thick aluminum foil using an applicator, and then dried in an electric oven at 120° C.±5° C. for 25 minutes to prepare an electrode film. Subsequently, the electrode film was subjected to a rolling treatment using a roll press (3t hydraulic roll press manufactured by THANK METAL) to obtain a standard positive electrode. The basis weight per unit area of the electrode mixture layer was 20 mg/cm$^2$, and the density of the electrode mixture layer after the rolling treatment was 2.1 g/cc.

TABLE 4

| | | | Dispersion composition | | | Active material | Thickener CMC | Binder PTFE |
| | | | CNT (A) | | Dispersant | | | |
| | Positive electrode | | Type | Non-volatile content mass % | Non-volatile content mass % | Non-volatile content mass % | Non-volatile content mass % | Non-volatile content mass % |
|---|---|---|---|---|---|---|---|---|
| Example 3-1 | Positive electrode 1 | Dispersion composition 1 | TUBALL | 0.10 | 0.09 | 97.3 | 1.0 | 1.5 |
| Example 3-2 | Positive electrode 2 | Dispersion composition 2 | TUBALL | 0.10 | 0.09 | 97.3 | 1.0 | 1.5 |
| Example 3-3 | Positive electrode 3 | Dispersion composition 3 | TUBALL | 0.10 | 0.09 | 97.3 | 1.0 | 1.5 |
| Example 3-4 | Positive electrode 4 | Dispersion composition 4 | TUBALL | 0.10 | 0.09 | 97.3 | 1.0 | 1.5 |
| Example 3-5 | Positive electrode 5 | Dispersion composition 5 | TUBALL | 0.10 | 0.09 | 97.3 | 1.0 | 1.5 |
| Example 3-6 | Positive electrode 6 | Dispersion composition 6 | TUBALL | 0.10 | 0.09 | 97.3 | 1.0 | 1.5 |
| Example 3-7 | Positive electrode 7 | Dispersion composition 7 | TUBALL | 0.10 | 0.09 | 97.3 | 1.0 | 1.5 |
| Example 3-8 | Positive electrode 8 | Dispersion composition 8 | JENOTUBE10B | 0.10 | 0.04 | 97.4 | 1.0 | 1.5 |
| Example 3-9 | Positive electrode 9 | Dispersion composition 9 | JENOTUBE10B | 0.10 | 0.04 | 97.4 | 1.0 | 1.5 |
| Example 3-10 | Positive electrode 10 | Dispersion composition 10 | JENOTUBE10B | 0.10 | 0.04 | 97.4 | 1.0 | 1.5 |
| Example 3-11 | Positive electrode 11 | Dispersion composition 11 | JENOTUBE10B | 0.10 | 0.04 | 97.4 | 1.0 | 1.5 |
| Example 3-12 | Positive electrode 12 | Dispersion composition 12 | JENOTUBE6A | 0.10 | 0.06 | 97.3 | 1.0 | 1.5 |
| Example 3-13 | Positive electrode 13 | Dispersion composition 13 | JENOTUBE6A | 0.10 | 0.06 | 97.3 | 1.0 | 1.5 |
| Example 3-14 | Positive electrode 14 | Dispersion composition 14 | JENOTUBE6A | 0.10 | 0.06 | 97.3 | 1.0 | 1.5 |
| Example 3-15 | Positive electrode 15 | Dispersion composition 15 | JENOTUBE6A | 0.10 | 0.06 | 97.3 | 1.0 | 1.5 |
| Example 3-16 | Positive electrode 16 | Dispersion composition 16 | TNSAR | 0.10 | 0.09 | 97.3 | 1.0 | 1.5 |
| Example 3-17 | Positive electrode 17 | Dispersion composition 17 | BT1001M | 0.10 | 0.04 | 97.4 | 1.0 | 1.5 |
| Example 3-18 | Positive electrode 18 | Dispersion composition 18 | TUBALL | 0.50 | 0.45 | 96.6 | 1.0 | 1.5 |
| Example 3-19 | Positive electrode 19 | Dispersion composition 19 | TUBALL | 0.50 | 0.45 | 96.6 | 1.0 | 1.5 |
| Example 3-20 | Positive electrode 20 | Dispersion composition 20 | TUBALL | 0.50 | 0.45 | 96.6 | 1.0 | 1.5 |
| Example 3-21 | Positive electrode 21 | Dispersion composition 21 | TUBALL | 0.50 | 0.45 | 96.6 | 1.0 | 1.5 |
| Example 3-22 | Positive electrode 22 | Dispersion composition 22 | TUBALL | 0.50 | 0.45 | 96.6 | 1.0 | 1.5 |
| Example 3-23 | Positive electrode 23 | Dispersion composition 23 | TUBALL | 0.50 | 0.45 | 96.6 | 1.0 | 1.5 |
| Example 3-24 | Positive electrode 24 | Dispersion composition 24 | TUBALL | 0.50 | 0.45 | 96.6 | 1.0 | 1.5 |
| Example 3-25 | Positive electrode 25 | Dispersion composition 25 | TUBALL | 2.0 | 1.80 | 93.7 | 1.0 | 1.5 |
| Example 3-26 | Positive electrode 26 | Dispersion composition 26 | TUBALL | 0.50 | 0.45 | 96.6 | 1.0 | 1.5 |
| Example 3-27 | Positive electrode 27 | Dispersion composition 27 | TUBALL | 0.50 | 0.45 | 96.6 | 1.0 | 1.5 |
| Example 3-28 | Positive electrode 28 | Dispersion composition 28 | TUBALL | 0.50 | 0.45 | 96.6 | 1.0 | 1.5 |
| Example 3-29 | Positive electrode 29 | Dispersion composition 29 | TUBALL | 0.50 | 0.45 | 96.6 | 1.0 | 1.5 |
| Example 3-30 | Positive electrode 30 | Dispersion composition 30 | TUBALL | 0.50 | 0.45 | 96.6 | 1.0 | 1.5 |
| Example 3-31 | Positive electrode 31 | Dispersion composition 31 | TUBALL | 0.50 | 0.45 | 96.6 | 1.0 | 1.5 |
| Example 3-32 | Positive electrode 32 | Dispersion composition 32 | TUBALL | 0.10 | 0.09 | 97.3 | 1.0 | 1.5 |
| Example 3-33 | Positive electrode 33 | Dispersion composition 33 | TUBALL | 0.10 | 0.09 | 97.3 | 1.0 | 1.5 |
| Example 3-34 | Positive electrode 34 | Dispersion composition 34 | TUBALL | 0.10 | 0.09 | 97.3 | 1.0 | 1.5 |
| Example 3-35 | Positive electrode 35 | Dispersion composition 35 | TUBALL | 0.10 | 0.09 | 97.3 | 1.0 | 1.5 |
| Example 3-36 | Positive electrode 36 | Dispersion composition 36 | TUBALL | 0.10 | 0.09 | 97.3 | 1.0 | 1.5 |
| Comparative Example 3-1 | Comparative positive electrode 1 | Comparative dispersion composition 1 | TUBALL | 0.10 | 0.09 | 97.3 | 1.0 | 1.5 |
| Comparative Example 3-2 | Comparative positive electrode 2 | Comparative dispersion composition 2 | TUBALL | 0.10 | 0.09 | 97.3 | 1.0 | 1.5 |
| Comparative Example 3-3 | Comparative positive electrode 3 | Comparative dispersion composition 3 | TUBALL | 0.10 | 0.09 | 97.3 | 1.0 | 1.5 |
| Comparative Example 3-4 | Comparative positive electrode 4 | Comparative dispersion composition 4 | TUBALL | 0.10 | 0.09 | 97.3 | 1.0 | 1.5 |
| Comparative Example 3-5 | Comparative positive electrode 5 | Comparative dispersion composition 5 | TUBALL | 0.10 | 0.09 | 97.3 | 1.0 | 1.5 |

(Preparation of Secondary Battery)

Using the standard positive electrode and the negative electrode or the comparative negative electrode described in Table 5, or using the positive electrode or the comparative positive electrode and the standard negative electrode described in Table 6, which were punched out to 50 mm×45 mm and 45 mm×40 mm, respectively, the punched positive electrode and negative electrode, with a separator (porous polypropylene film) inserted therebetween, were inserted into an aluminum laminate bag and dried in an electric oven at 70° C. for 1 hour. Subsequently, in a glove box filled with argon gas, 2 mL of an electrolyte (non-aqueous electrolyte obtained by mixing ethylene carbonate, dimethyl carbonate, and diethyl carbonate in a volume ratio of 1:1:1 to prepare a mixed solvent, further, adding 1 mass % of vinylene carbonate as an additive with respect to 100 mass % of the mixed solvent, and then dissolving $LiPF_6$ at a concentration of 1 M) was injected, and the aluminum laminate bag was then sealed to prepare each secondary battery.

<Evaluation of Secondary Battery>

The obtained secondary batteries were evaluated according to the following method. The results are shown in Table 5 and Table 6.

(Rate Characteristic Evaluation Method for Secondary Battery)

The evaluation was performed in the same manner as described in paragraph 0178 of Japanese Patent No. 7107413. With the evaluation criteria ⊚ to Δ, practical use is possible.

Evaluation Criteria for Rate Characteristics

⊚: 90% or higher (excellent)

○: 85% or higher and less than 90% (good)

Δ: 80% or higher and less than 85% (acceptable)

x: Less than 80%

(Cycle Characteristics Evaluation Method for Secondary Battery)

The evaluation was performed in the same manner as described in paragraph 0179 of Japanese Patent No. 7107413. With the evaluation criteria being ⊚ to Δ, practical use is possible.

Evaluation Criteria for Cycle Characteristics

⊚: 90% or higher (excellent)

○: 80% or higher and less than 90% (good)

Δ: 70% or higher and less than 80% (acceptable)

x: Less than 70%

TABLE 5

| | Negative electrode | Positive electrode | Rate characteristics | Cycle characteristics |
|---|---|---|---|---|
| Example 5-1 | Negative electrode 1 | Standard positive electrode | ⊚ | ⊚ |
| Example 5-2 | Negative electrode 2 | Standard positive electrode | ⊚ | ⊚ |
| Example 5-3 | Negative electrode 3 | Standard positive electrode | ⊚ | ⊚ |
| Example 5-4 | Negative electrode 4 | Standard positive electrode | ⊚ | ⊚ |
| Example 5-5 | Negative electrode 5 | Standard positive electrode | ⊚ | ⊚ |
| Example 5-6 | Negative electrode 6 | Standard positive electrode | ⊚ | ○ |
| Example 5-7 | Negative electrode 7 | Standard positive electrode | ⊚ | ○ |
| Example 5-8 | Negative electrode 8 | Standard positive electrode | ○ | ○ |
| Example 5-9 | Negative electrode 9 | Standard positive electrode | ○ | ○ |
| Example 5-10 | Negative electrode 10 | Standard positive electrode | ○ | ○ |
| Example 5-11 | Negative electrode 11 | Standard positive electrode | ○ | ○ |
| Example 5-12 | Negative electrode 12 | Standard positive electrode | ⊚ | ○ |
| Example 5-13 | Negative electrode 13 | Standard positive electrode | ⊚ | ○ |
| Example 5-14 | Negative electrode 14 | Standard positive electrode | ⊚ | ○ |
| Example 5-15 | Negative electrode 15 | Standard positive electrode | ⊚ | ○ |
| Example 5-16 | Negative electrode 16 | Standard positive electrode | ⊚ | ⊚ |
| Example 5-17 | Negative electrode 17 | Standard positive electrode | ○ | ○ |
| Example 5-18 | Negative electrode 18 | Standard positive electrode | ⊚ | ⊚ |
| Example 5-19 | Negative electrode 19 | Standard positive electrode | ○ | ⊚ |
| Example 5-20 | Negative electrode 20 | Standard positive electrode | ⊚ | ○ |
| Example 5-21 | Negative electrode 21 | Standard positive electrode | ⊚ | ⊚ |
| Example 5-22 | Negative electrode 22 | Standard positive electrode | ⊚ | ○ |
| Example 5-23 | Negative electrode 23 | Standard positive electrode | ○ | ○ |
| Example 5-24 | Negative electrode 24 | Standard positive electrode | ⊚ | ⊚ |
| Example 5-25 | Negative electrode 25 | Standard positive electrode | ⊚ | ⊚ |
| Example 5-26 | Negative electrode 26 | Standard positive electrode | ⊚ | ○ |
| Example 5-27 | Negative electrode 27 | Standard positive electrode | ⊚ | ⊚ |
| Example 5-28 | Negative electrode 28 | Standard positive electrode | ○ | ○ |
| Example 5-29 | Negative electrode 29 | Standard positive electrode | ○ | ○ |
| Example 5-30 | Negative electrode 30 | Standard positive electrode | ⊚ | ⊚ |
| Example 5-31 | Negative electrode 31 | Standard positive electrode | ⊚ | ⊚ |
| Example 5-32 | Negative electrode 32 | Standard positive electrode | ⊚ | ⊚ |
| Example 5-33 | Negative electrode 33 | Standard positive electrode | ⊚ | ⊚ |
| Example 5-34 | Negative electrode 34 | Standard positive electrode | ○ | ○ |
| Example 5-35 | Negative electrode 35 | Standard positive electrode | ⊚ | ⊚ |
| Example 5-36 | Negative electrode 36 | Standard positive electrode | ○ | ⊚ |
| Comparative Example 5-1 | Comparative negative electrode 1 | Standard positive electrode | X | ○ |
| Comparative Example 5-2 | Comparative negative electrode 2 | Standard positive electrode | X | ○ |
| Comparative Example 5-3 | Comparative negative electrode 3 | Standard positive electrode | X | Δ |
| Comparative Example 5-4 | Comparative negative electrode 4 | Standard positive electrode | X | Δ |
| Comparative Example 5-5 | Comparative negative electrode 5 | Standard positive electrode | X | Δ |

TABLE 6

| | Negative electrode | Positive electrode | Rate characteristics | Cycle characteristics |
|---|---|---|---|---|
| Example 6-1 | Standard negative electrode | Positive electrode 1 | ⊚ | ⊚ |
| Example 6-2 | Standard negative electrode | Positive electrode 2 | ⊚ | ⊚ |
| Example 6-3 | Standard negative electrode | Positive electrode 3 | ⊚ | ⊚ |
| Example 6-4 | Standard negative electrode | Positive electrode 4 | ⊚ | ⊚ |
| Example 6-5 | Standard negative electrode | Positive electrode 5 | ⊚ | ⊚ |
| Example 6-6 | Standard negative electrode | Positive electrode 6 | ○ | ⊚ |
| Example 6-7 | Standard negative electrode | Positive electrode 7 | ○ | ⊚ |
| Example 6-8 | Standard negative electrode | Positive electrode 8 | ○ | ○ |
| Example 6-9 | Standard negative electrode | Positive electrode 9 | ○ | ○ |
| Example 6-10 | Standard negative electrode | Positive electrode 10 | ○ | ○ |
| Example 6-11 | Standard negative electrode | Positive electrode 11 | ○ | ○ |
| Example 6-12 | Standard negative electrode | Positive electrode 12 | ○ | ○ |
| Example 6-13 | Standard negative electrode | Positive electrode 13 | ○ | ○ |
| Example 6-14 | Standard negative electrode | Positive electrode 14 | ○ | ○ |
| Example 6-15 | Standard negative electrode | Positive electrode 15 | ○ | ○ |
| Example 6-16 | Standard negative electrode | Positive electrode 16 | ⊚ | ⊚ |
| Example 6-17 | Standard negative electrode | Positive electrode 17 | ○ | ○ |
| Example 6-18 | Standard negative electrode | Positive electrode 18 | ○ | ○ |
| Example 6-19 | Standard negative electrode | Positive electrode 19 | ⊚ | ○ |
| Example 6-20 | Standard negative electrode | Positive electrode 20 | ⊚ | ⊚ |
| Example 6-21 | Standard negative electrode | Positive electrode 21 | ⊚ | ⊚ |
| Example 6-22 | Standard negative electrode | Positive electrode 22 | ⊚ | ○ |
| Example 6-23 | Standard negative electrode | Positive electrode 23 | ○ | ○ |
| Example 6-24 | Standard negative electrode | Positive electrode 24 | ○ | ○ |
| Example 6-25 | Standard negative electrode | Positive electrode 25 | ○ | ○ |
| Example 6-26 | Standard negative electrode | Positive electrode 26 | ○ | ○ |
| Example 6-27 | Standard negative electrode | Positive electrode 27 | ○ | ○ |
| Example 6-28 | Standard negative electrode | Positive electrode 28 | ⊚ | ⊚ |
| Example 6-29 | Standard negative electrode | Positive electrode 29 | ○ | ○ |
| Example 6-30 | Standard negative electrode | Positive electrode 30 | ⊚ | ⊚ |
| Example 6-31 | Standard negative electrode | Positive electrode 31 | ⊚ | ⊚ |
| Example 6-32 | Standard negative electrode | Positive electrode 32 | ⊚ | ○ |
| Example 6-33 | Standard negative electrode | Positive electrode 33 | ⊚ | ⊚ |
| Example 6-34 | Standard negative electrode | Positive electrode 34 | ○ | ○ |
| Example 6-35 | Standard negative electrode | Positive electrode 35 | ⊚ | ⊚ |
| Example 6-36 | Standard negative electrode | Positive electrode 36 | ○ | ⊚ |
| Comparative Example 6-1 | Standard negative electrode | Comparative positive electrode 1 | X | ○ |
| Comparative Example 6-2 | Standard negative electrode | Comparative positive electrode 2 | X | ○ |
| Comparative Example 6-3 | Standard negative electrode | Comparative positive electrode 3 | X | Δ |
| Comparative Example 6-4 | Standard negative electrode | Comparative positive electrode 4 | X | Δ |
| Comparative Example 6-5 | Standard negative electrode | Comparative positive electrode 5 | X | Δ |

As can be learned from Tables 2, 5, and 6, it has been confirmed that a dispersion composition that includes a polymer containing 80 mass % or more of a carboxyl group-containing structural unit and a basic compound, and is adjusted to an appropriate pH with respect to a particle diameter $D_{50}$, can achieve fluidity, storage stability, and battery performance.

When adjusting the particle diameter $D_{50}$ of the carbon nanotube dispersion composition to 0.3 to 7.0 μm, dispersion using a dispersant (B) which is a polymer having a weight average molecular weight of 5,000 or more and 360,000 or less and including a carboxyl group-containing structural unit could be applied by adjusting the pH, regardless of the type of the carbon nanotubes or the type of the basic compound.

As in the comparative examples, in the case where the pH was low or in the case where a polymer with a low content ratio of the carboxyl group-containing structural unit was used, fluidity was poor due to insufficient electric repulsive force of the carboxyl groups. In the case where the pH was high, the affinity between the polymer and the carbon nanotubes decreased, and thickening due to aggregation of the carbon nanotubes occurred. In the case where the dis- persant was a polymer with a small molecular weight, steric repulsive force was insufficient, and fluidity was poor. In the case of a polymer with a large molecular weight, thickening occurred due to the viscosity of the polymer itself.

Although the present invention has been described above with reference to the embodiments, the present invention is not limited to the above. Various modifications understand- able by those skilled in the art may be made to the configu- rations and details of the present invention within the scope of the invention.

The invention claimed is:

1. A carbon nanotube dispersion composition comprising carbon nanotubes (A), a dispersant (B), and a solvent (C), wherein a particle diameter $D_{50}$ at a cumulative volume of 50% according to laser diffraction particle size distribution measurement is 0.3 to 7 μm, and the carbon nanotube dispersion composition satisfies (1) and (2) below:

(1) the dispersant (B) is a polymer that has a weight average molecular weight of 5,000 or more and 360, 000 or less and comprises a carboxyl group-containing structural unit derived from at least one of (meth) acrylic acid and (meth)acrylate having a carboxyl group, wherein a content ratio of the carboxyl group-containing structural unit is 80 mass % or more based on a mass of the polymer; and (2) in a case where the particle diameter $D_{50}$ at a cumulative volume of 50% according to laser diffraction particle size distribution measurement of the carbon nanotube dispersion composition is X [μm], and a pH is Y, X and Y satisfy (Formula a) and (Formula b) below:

$$Y \geq -0.149X + 4.545 \qquad \text{(Formula a)}$$

$$Y \leq -0.134X + 5.140, \qquad \text{(Formula b)}$$

a BET specific surface area according to nitrogen adsorption measurement of the carbon nanotubes (A) is 100 $m^2/g$ or more and 1200 $m^2/g$ or less, in the case where the BET specific surface area is 100 $m^2/g$ or more and less than 700 $m^2/g$, a G/D ratio is 0.8 or more and 8 or less, and in the case where the BET specific surface area is 700 $m^2/g$ or more and 1200 $m^2/g$ or less, the G/D ratio is 30 or more and 100 or less, and wherein no dispersant other than the dispersant (B) is present.

2. The carbon nanotube dispersion composition according to claim 1, further comprising a basic compound (D).

3. The carbon nanotube dispersion composition according to claim 1, wherein a phase angle at 1 Hz at 25° C. according to dynamic viscoelasticity measurement is 3° or more and less than 60°.

4. The carbon nanotube dispersion composition according to claim 1, wherein a complex modulus at 1 Hz at 25° C. according to dynamic viscoelasticity measurement is 5 Pa or more and less than 300 Pa.

5. The carbon nanotube dispersion composition according to claim 1, wherein a content of the dispersant (B) is 15 to 160 parts by mass with respect to 100 parts by mass of the carbon nanotubes (A).

6. The carbon nanotube dispersion composition according to claim 1, wherein a content of the dispersant (B) is 15 to 90 parts by mass with respect to 100 parts by mass of the carbon nanotubes (A).

7. The carbon nanotube dispersion composition according to claim 1, wherein the carboxyl group-containing structural unit is a structural unit derived from (meth)acrylic acid.

8. A mixture slurry comprising the carbon nanotube dispersion composition according to claim 1 and an active material.

9. An electrode film formed from the mixture slurry according to claim 8.

10. A secondary battery comprising a positive electrode and a negative electrode, wherein at least one of the positive electrode and the negative electrode comprises the electrode film according to claim 9.

11. A carbon nanotube dispersion composition comprising carbon nanotubes (A), a dispersant (B), and a solvent (C), wherein a particle diameter $D_{50}$ at a cumulative volume of 50% according to laser diffraction particle size distribution measurement is 0.3 to 7 μm, and the carbon nanotube dispersion composition satisfies (1) and (2) below:

(1) the dispersant (B) is a polymer that has a weight average molecular weight of 5,000 or more and 360,000 or less and comprises a carboxyl group-containing structural unit derived from at least one of (meth) acrylic acid and (meth)acrylate having a carboxyl group, wherein a content ratio of the carboxyl group-containing structural unit is 80 mass % or more based on a mass of the polymer; and (2) in a case where the particle diameter $D_{50}$ at a cumulative volume of 50% according to laser diffraction particle size distribution measurement of the carbon nanotube dispersion composition is X [μm], and a pH is Y, X and Y satisfy (Formula a) and (Formula b) below:

$$Y \geq -0.149X + 4.545 \qquad \text{(Formula a)}$$

$$Y \leq -0.134X + 5.140, \qquad \text{(Formula b)}$$

in the case where a BET specific surface area according to nitrogen adsorption measurement of the carbon nanotubes (A) is 100 $m^2/g$ or more and less than 700 $m^2/g$, a G/D ratio is 0.8 or more and 8 or less, wherein a content of the dispersant (B) is 15 to 90 parts by mass with respect to 100 parts by mass of the carbon nanotubes (A), and wherein no dispersant other than the dispersant (B) is present.

* * * * *